United States Patent
Sinn

(10) Patent No.: US 7,216,163 B2
(45) Date of Patent: May 8, 2007

(54) METHOD AND APPARATUS FOR PROVISIONING TASKS USING A PROVISIONING BRIDGE SERVER

(75) Inventor: Richard P. Sinn, Milpitas, CA (US)

(73) Assignee: Oracle International Corporation, Redwood Shores, CA (US)

( * ) Notice: Subject to any disclaimer, the term of this patent is extended or adjusted under 35 U.S.C. 154(b) by 682 days.

(21) Appl. No.: 10/146,150

(22) Filed: May 15, 2002

(65) Prior Publication Data

US 2003/0217101 A1 Nov. 20, 2003

(51) Int. Cl.
*G06F 15/16* (2006.01)
*G06F 15/173* (2006.01)

(52) U.S. Cl. .................. 709/224; 709/203; 709/223; 709/225; 709/226

(58) Field of Classification Search ................ 709/203, 709/223, 201, 224, 225, 226; 713/201
See application file for complete search history.

(56) References Cited

U.S. PATENT DOCUMENTS

| | | |
|---|---|---|
| 5,077,666 A | 12/1991 | Brimm et al. |
| 5,301,320 A | 4/1994 | McAtee et al. |
| 5,455,953 A | 10/1995 | Russell |
| 5,530,861 A | 6/1996 | Diamant et al. |
| 5,581,691 A | 12/1996 | Hsu et al. |
| 5,659,616 A | 8/1997 | Sudia |
| 5,678,041 A | 10/1997 | Baker et al. |
| 5,692,125 A | 11/1997 | Schloss et al. |
| 5,708,780 A | 1/1998 | Levergood et al. |
| 5,734,837 A | 3/1998 | Flores et al. |
| 5,745,574 A | 4/1998 | Muftic |
| 5,764,890 A | 6/1998 | Glasser et al. |
| 5,796,841 A | 8/1998 | Cordery et al. |
| 5,822,454 A | 10/1998 | Rangarajan |
| 5,831,975 A | 11/1998 | Chen et al. |
| 5,867,665 A | 2/1999 | Butman et al. |
| 5,867,824 A | 2/1999 | Saito et al. |
| 5,884,284 A | 3/1999 | Peters et al. |

(Continued)

FOREIGN PATENT DOCUMENTS

WO  WO 02/07396 A1  1/2002

OTHER PUBLICATIONS

Howes, Timothy A. et al., "Understanding And Deploying LDAP Directory Services," Netscape Communications Corporation, pp. 2 cover pp. 102-105, 277-292 and 699-723, 1999.

(Continued)

*Primary Examiner*—Kenneth R. Coulter
*Assistant Examiner*—Quang N. Nguyen
(74) *Attorney, Agent, or Firm*—Townsend and Townsend and Crew LLP

(57) ABSTRACT

The present invention is directed to technology for interacting with provisioning systems. An entity has an associated job code attribute that corresponds to a set of external resources. In one embodiment, an Identity System assigns the job code attribute to the entity. The external resources may be supported by different provisioning systems. A Provisioning Bridge Server determines whether a set of provisioning systems supports the resources corresponding to the job code attribute. The Provisioning Bridge Server also provisions the tasks required to make the external resources available to the entity. The tasks may be provisioned across multiple provisioning systems.

34 Claims, 18 Drawing Sheets

U.S. PATENT DOCUMENTS

| | | | |
|---|---|---|---|
| 5,903,882 A | 5/1999 | Asay et al. | |
| 5,907,837 A | 5/1999 | Ferrel et al. | |
| 5,940,834 A | 8/1999 | Pinard et al. | |
| 5,944,824 A | 8/1999 | He | |
| 5,960,422 A | 9/1999 | Prasad | |
| 5,961,593 A | 10/1999 | Gabber et al. | |
| 5,966,702 A | 10/1999 | Fresko et al. | |
| 5,987,457 A | 11/1999 | Ballard | |
| 5,991,768 A | 11/1999 | Sun et al. | |
| 5,991,807 A | 11/1999 | Schmidt et al. | |
| 5,991,810 A | 11/1999 | Shapiro et al. | |
| 5,999,911 A | 12/1999 | Berg et al. | |
| 6,012,098 A | 1/2000 | Bayeh et al. | |
| 6,041,306 A | 3/2000 | Du et al. | |
| 6,044,462 A | 3/2000 | Zubeldia et al. | |
| 6,073,109 A | 6/2000 | Flores et al. | |
| 6,073,242 A | 6/2000 | Hardy et al. | |
| 6,098,056 A | 8/2000 | Rusnak et al. | |
| 6,105,006 A | 8/2000 | Davis et al. | |
| 6,105,063 A | 8/2000 | Hayes, Jr. | |
| 6,105,066 A | 8/2000 | Hayes, Jr. | |
| 6,112,181 A | 8/2000 | Shear et al. | |
| 6,131,120 A | 10/2000 | Reid | |
| 6,138,104 A | 10/2000 | Marchak et al. | |
| 6,141,778 A * | 10/2000 | Kane et al. | 713/201 |
| 6,151,531 A | 11/2000 | Frankel et al. | |
| 6,158,010 A * | 12/2000 | Moriconi et al. | 713/201 |
| 6,173,311 B1 | 1/2001 | Hassett et al. | |
| 6,182,142 B1 * | 1/2001 | Win et al. | 709/229 |
| 6,195,689 B1 * | 2/2001 | Bahlmann | 709/217 |
| 6,195,696 B1 | 2/2001 | Baber et al. | |
| 6,208,986 B1 | 3/2001 | Schneck et al. | |
| 6,212,558 B1 | 4/2001 | Antur et al. | |
| 6,216,231 B1 | 4/2001 | Stubblebine | |
| 6,219,667 B1 | 4/2001 | Lu et al. | |
| 6,223,291 B1 | 4/2001 | Puhl et al. | |
| 6,256,739 B1 | 7/2001 | Skopp et al. | |
| 6,263,332 B1 | 7/2001 | Nasr et al. | |
| 6,263,363 B1 | 7/2001 | Rosenblatt et al. | |
| 6,266,420 B1 | 7/2001 | Langford et al. | |
| 6,275,916 B1 | 8/2001 | Weldon, Jr. et al. | |
| 6,292,833 B1 | 9/2001 | Liao et al. | |
| 6,295,061 B1 | 9/2001 | Park et al. | |
| 6,304,949 B1 | 10/2001 | Houlsdworth | |
| 6,317,783 B1 | 11/2001 | Freishtat et al. | |
| 6,330,569 B1 | 12/2001 | Baisley et al. | |
| 6,336,124 B1 | 1/2002 | Alam et al. | |
| 6,336,214 B1 | 1/2002 | Sundaresan | |
| 6,338,097 B1 | 1/2002 | Krenzke et al. | |
| 6,339,826 B2 | 1/2002 | Hayes, Jr. et al. | |
| 6,347,312 B1 | 2/2002 | Byrne et al. | |
| 6,356,996 B1 | 3/2002 | Adams | |
| 6,366,913 B1 | 4/2002 | Fitler, Jr. et al. | |
| 6,367,013 B1 | 4/2002 | Bisbee et al. | |
| 6,389,589 B1 | 5/2002 | Mishra et al. | |
| 6,397,232 B1 | 5/2002 | Cheng-Hung et al. | |
| 6,408,336 B1 | 6/2002 | Schneider et al. | |
| 6,434,531 B1 | 8/2002 | Lancelot et al. | |
| 6,438,690 B1 | 8/2002 | Patel et al. | |
| 6,442,567 B1 | 8/2002 | Retallick et al. | |
| 6,457,066 B1 | 9/2002 | Mein et al. | |
| 6,487,600 B1 | 11/2002 | Lynch | |
| 6,493,702 B1 | 12/2002 | Adar et al. | |
| 6,493,731 B1 | 12/2002 | Jones et al. | |
| 6,507,857 B1 | 1/2003 | Yalcinalp | |
| 6,519,571 B1 | 2/2003 | Guheen et al. | |
| 6,519,767 B1 | 2/2003 | Carter et al. | |
| 6,523,027 B1 | 2/2003 | Underwood | |
| 6,539,021 B1 | 3/2003 | Kennelly et al. | |
| 6,539,379 B1 | 3/2003 | Vora et al. | |
| 6,540,142 B1 | 4/2003 | Alleshouse | |
| 6,542,515 B1 | 4/2003 | Kumar et al. | |
| 6,564,370 B1 | 5/2003 | Hunt | |
| 6,571,216 B1 | 5/2003 | Garg et al. | |
| 6,571,279 B1 | 5/2003 | Herz et al. | |
| 6,574,675 B1 | 6/2003 | Swenson | |
| 6,587,856 B1 | 7/2003 | Srinivasan et al. | |
| 6,591,260 B1 | 7/2003 | Schwarzhoff et al. | |
| 6,606,644 B1 | 8/2003 | Ford et al. | |
| 6,632,251 B1 | 10/2003 | Rutten et al. | |
| 6,643,661 B2 | 11/2003 | Polizzi et al. | |
| 6,655,593 B2 | 12/2003 | Alleshouse | |
| 6,671,695 B2 | 12/2003 | McFadden | |
| 6,675,261 B2 | 1/2004 | Shandony | |
| 6,678,733 B1 | 1/2004 | Brown et al. | |
| 6,728,685 B1 | 4/2004 | Ahluwalia | |
| 6,745,327 B1 | 6/2004 | Messing | |
| 6,748,374 B1 | 6/2004 | Madan et al. | |
| 6,748,569 B1 | 6/2004 | Brooke et al. | |
| 6,751,797 B1 | 6/2004 | Desgranges et al. | |
| 6,754,702 B1 | 6/2004 | Kennelly et al. | |
| 6,775,782 B1 | 8/2004 | Buros et al. | |
| 6,782,379 B2 | 8/2004 | Lee | |
| 6,785,726 B1 | 8/2004 | Freeman et al. | |
| 6,791,949 B1 | 9/2004 | Ryu et al. | |
| 6,816,871 B2 | 11/2004 | Lee | |
| 6,842,863 B1 | 1/2005 | Fox et al. | |
| 6,851,054 B2 | 2/2005 | Wheeler et al. | |
| 6,854,016 B1 | 2/2005 | Kraenzel et al. | |
| 6,859,823 B1 | 2/2005 | Nishihara et al. | |
| 6,886,170 B1 | 4/2005 | Bahrs et al. | |
| 6,901,588 B1 | 5/2005 | Krapf et al. | |
| 6,959,415 B1 | 10/2005 | Soderberg et al. | |
| 6,968,503 B1 | 11/2005 | Chang et al. | |
| 6,970,862 B2 | 11/2005 | Kwan | |
| 6,986,138 B1 | 1/2006 | Sakaguchi et al. | |
| 2001/0002485 A1 | 5/2001 | Bisbee et al. | |
| 2001/0007133 A1 * | 7/2001 | Moriconi et al. | 713/201 |
| 2001/0027439 A1 | 10/2001 | Holtzman et al. | |
| 2001/0049770 A1 | 12/2001 | Cai et al. | |
| 2002/0032684 A1 | 3/2002 | Kobayashi et al. | |
| 2002/0053023 A1 | 5/2002 | Patterson et al. | |
| 2002/0062435 A1 | 5/2002 | Nemirovsky et al. | |
| 2002/0065701 A1 | 5/2002 | Kim et al. | |
| 2002/0078307 A1 | 6/2002 | Zahir | |
| 2002/0091836 A1 | 7/2002 | Moetteli | |
| 2002/0099822 A1 | 7/2002 | Rubin et al. | |
| 2002/0103819 A1 | 8/2002 | Duvillier et al. | |
| 2002/0108003 A1 | 8/2002 | Ellis et al. | |
| 2002/0129024 A1 | 9/2002 | Lee | |
| 2002/0129135 A1 | 9/2002 | Delany et al. | |
| 2002/0129177 A1 | 9/2002 | McGuire et al. | |
| 2002/0133516 A1 | 9/2002 | Davis et al. | |
| 2002/0138543 A1 | 9/2002 | Teng et al. | |
| 2002/0138572 A1 | 9/2002 | Delany et al. | |
| 2002/0138577 A1 | 9/2002 | Teng et al. | |
| 2002/0138763 A1 | 9/2002 | Delany et al. | |
| 2002/0143865 A1 | 10/2002 | Tung Loo et al. | |
| 2002/0143943 A1 | 10/2002 | Lee et al. | |
| 2002/0147746 A1 | 10/2002 | Lee | |
| 2002/0147801 A1 * | 10/2002 | Gullotta et al. | 709/223 |
| 2002/0147813 A1 | 10/2002 | Teng et al. | |
| 2002/0152244 A1 | 10/2002 | Dean et al. | |
| 2002/0152254 A1 | 10/2002 | Teng | |
| 2002/0156879 A1 | 10/2002 | Delany et al. | |
| 2002/0166049 A1 | 11/2002 | Sinn | |
| 2002/0174238 A1 | 11/2002 | Sinn et al. | |
| 2002/0184444 A1 | 12/2002 | Shandony | |
| 2003/0065921 A1 | 4/2003 | Chang | |
| 2003/0105654 A1 * | 6/2003 | MacLeod et al. | 709/201 |
| 2003/0110376 A1 | 6/2003 | Wiener et al. | |
| 2003/0145074 A1 | 7/2003 | Penick | |
| 2004/0002903 A1 | 1/2004 | Stolfo et al. | |
| 2004/0049675 A1 | 3/2004 | Micali et al. | |

| | | |
|---|---|---|
| 2004/0064356 A1 | 4/2004 | Saito et al. |
| 2004/0153509 A1 | 8/2004 | Alcom et al. |
| 2006/0195575 A1 | 8/2006 | Delany |

OTHER PUBLICATIONS

Myers, M. et al., "X.509 Internet Public Key Infrastructure Online Certificate Status.Protocol—OCSP," The Internet Society, 22 pages, Jun. 1999.

U.S. Appl. No. 09/997,408, Office Action dated Sep. 7, 2005, 11 pages.

U.S. Appl. No. 09/997,408, Final Office Action dated Feb. 15, 2006, 7 pages.

U.S. Appl. No. 09/997,409, Office Action dated Jun. 3, 2005, 17 pages.

U.S. Appl. No. 09/997,409, Office Action dated Nov. 7, 2005, 12 pages.

U.S. Appl. No. 09/998,893, Office Action dated Jun. 13, 2005, 20 pages.

U.S. Appl. No. 09/998,893, Final Office Action dated Dec. 28, 2005, 12 pages.

U.S. Appl. No. 09/998,895, Office Action dated Mar. 25, 2005, 18 pages.

U.S. Appl. No. 09/998,895, Final Office Action dated Aug. 1, 2005, 19 pages.

U.S. Appl. No. 09/998,895, Advisory Action dated Oct. 20, 2005, 3 pages.

U.S. Appl. No. 09/998,895, Office Action dated Feb. 7, 2006, 13 pages.

U.S. Appl. No. 09/998,898, Office Action dated Sep. 21, 2005, 13 pages.

U.S. Appl. No. 09/998,908, Office Action dated Jan. 25, 2005, 24 pages.

U.S. Appl. No. 09/998,908, Final Office Action dated Aug. 22, 2005, 14 pages.

U.S. Appl. No. 09/998,908, Advisory Action dated Nov. 1, 2005, 3 pages.

U.S. Appl. No. 09/998,908, Office Action dated Feb. 16, 2006, 15 pages.

U.S. Appl. No. 09/998,910, Office Action dated Jan. 28, 2005, 12 pages.

U.S. Appl. No. 09/998,910, Office Action dated Dec. 13, 2005, 10 pages.

U.S. Appl. No. 09/998,914, Office Action dated Jul. 14, 2005, 19 pages.

U.S. Appl. No. 09/998,914, Final Office Action dated Jan. 30, 2006, 15 pages.

U.S. Appl. No. 09/998,916, Office Action dated Mar. 21, 2005, 16 pages.

U.S. Appl. No. 09/998,916, Final Office Action dated Sep. 8, 2005, 12 pages.

U.S. Appl. No. 09/998,916, Advisory Action dated Dec. 9, 2005, 4 pages.

U.S. Appl. No. 09/998,926, Office Action dated Aug. 25, 2005, 26 pages.

U.S. Appl. No. 09/998,926, Final Office Action dated Feb. 27, 2006, 15 pages.

U.S. Appl. No. 09/999,074, Office Action dated Mar. 24, 2005, 24 pages.

U.S. Appl. No. 09/999,074, Final Office Action dated Sep. 20, 2005, 19 pages.

U.S. Appl. No. 09/999,074, Advisory Action dated Dec. 20, 2005, 3 pages.

U.S. Appl. No. 09/999,177, Office Action dated Mar. 25, 2005, 23 pages.

U.S. Appl. No. 09/999,177, Final Office Action dated Sep. 14, 2005, 26 pages.

U.S. Appl. No. 09/999,177, Advisory Action dated Dec. 14, 2005, 6 pages.

U.S. Appl. No. 10/145,684, Final Office Action dated Dec. 1, 2005, 10 pages.

U.S. Appl. No. 10/145,684, Office Action dated Jun. 16, 2005, 17 pages.

U.S. Appl. No. 10/145,684, Advisory Action dated Mar. 9, 2006, 3 pages.

Leon, McAfee's NetTools Promises to Ease Network Desktop Diagnosis, InfoWorld, San Mateo, Jul. 24, 1995, vol. 17, Iss. 30, p. 53.

Cooney, IBM rolls out host-and server-based mgmt. apps, Network World, Framingham, Feb. 6, 1995, vol. 12, Iss. 6, pp. 6-7.

Walsh, Remedy releases three applications for help-desk suite, InfoWorld, San Mateo, Apr. 21, 1997, vol. 19, Iss. 16, p. 34.

Schmersal, Testing to maintain service standards, Communications News, Nokomis, Mar. 1998, vol. 35, Iss. 3, pp. 22-23.

Musthaler, The trouble with help desk selection, Network World, Framingham, Feb. 20, 1995, vol. 12, Iss. 8, pp. 35-39.

Clear Trust, Unified Access Management, Securant Technologies, Inc., pp. 1-23, 1997.

SiteMinder Agent Operations, Verson 4.0, Netegrity Inc., 1997.

SiteMinder Deployment Guide, Version 4.0, Netegrity Inc., 1997.

SiteMinder Policy Server Operations Guide, Version 4.0, Netegrity Inc., 1997.

SiteMinder Developer's API Guide, Version 4.0, Netegrity Inc., 1997.

SiteMinder Installation Guide, Version 4.0, Netegrity Inc., 1997.

Camenisch, Jan et al., "Privacy and Identity Management for Everyone", ACM, 2005, 8 pages.

Microsoft, "Microsoft's Vision for an Identity Metasystem", Microsoft Corporation, http://www.Identityblog.com/stories/2005/07/05/IdentityMetasystem.htm, printed date Oct. 6, 2006, 9 pages.

PC PRO, "Identity Systems", http://research.pcpro.co.uk/detail/ORG/1139341311_744.html, printed date Oct. 6, 2006, 2 pages.

Prasad, CK, "Distributing Sun Java System Identity Server Applications Using Java Web Start", Article Index, Apr. 2004, 8 pages.

U.S. Appl. No. 09/997,408, Office Action dated Aug. 7, 15 pages.

U.S. Appl. No. 09/997,409, Office Action dated May 3, 2006, 9 pages.

U.S. Appl. No. 09/997,409, Office Action dated Oct. 20, 2006, 21 pages.

U.S. Appl. No. 09/998,893, Office Action dated Jul. 17, 2006, 17 pages.

U.S. Appl. No. 09/998,895, Final Office Action dated Jul. 20, 2006, 22 pages.

U.S. Appl. No. 09/998,898, Office Action dated Mar. 28, 2006, 7 pages.

U.S. Appl. No. 09/998,908, Final Office Action dated Aug. 22, 2006, 25 pages.

U.S. Appl. No. 09/998,910, Office Action dated Sep. 27, 2006, 12 pages.

U.S. Appl. No. 09/998,916, Advisory Action dated Apr. 5, 2006, 11 pages.

U.S. Appl. No. 09/998,916, Office Action dated Sep. 5, 2006, 20 pages.

U.S. Appl. No. 09/998,926, Office Action dated Sep. 11, 2006, 19 pages.

U.S. Appl. No. 10/145,684, Office Action dated Jun. 30, 2006, 25 pages.

Wahl, M., "Informed Control Enabling Identity Interoperability", http://www.ldap.com/1/commentary/wahl/20050203_01.shtml, Feb. 3, 2005, 3 pages.

* cited by examiner

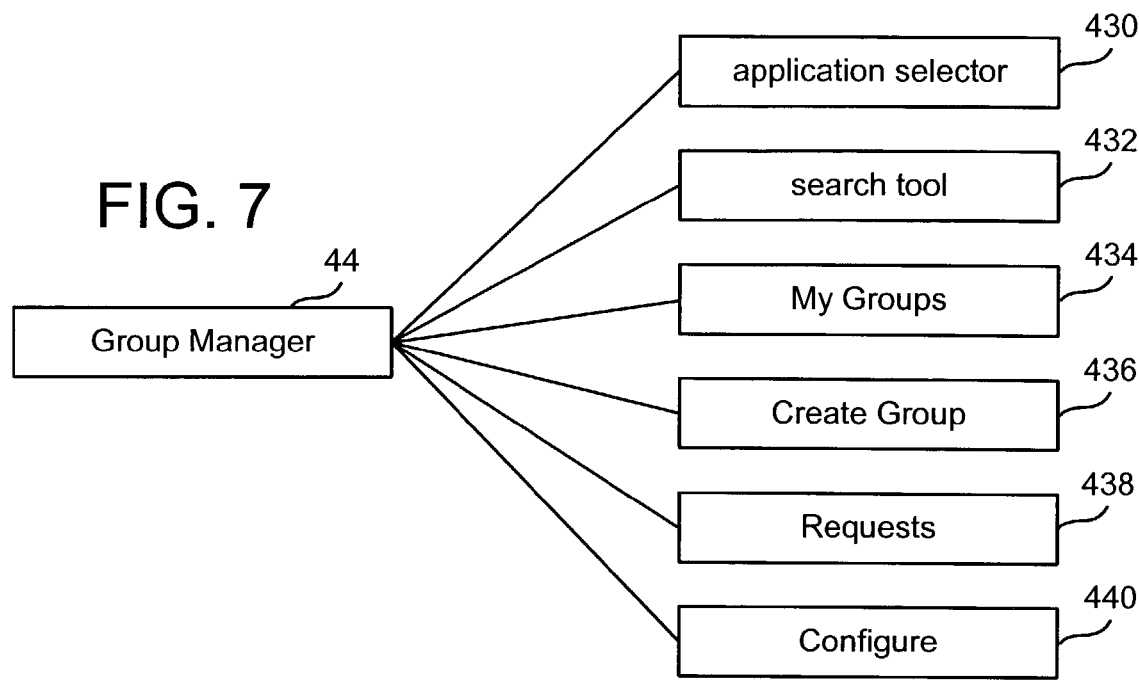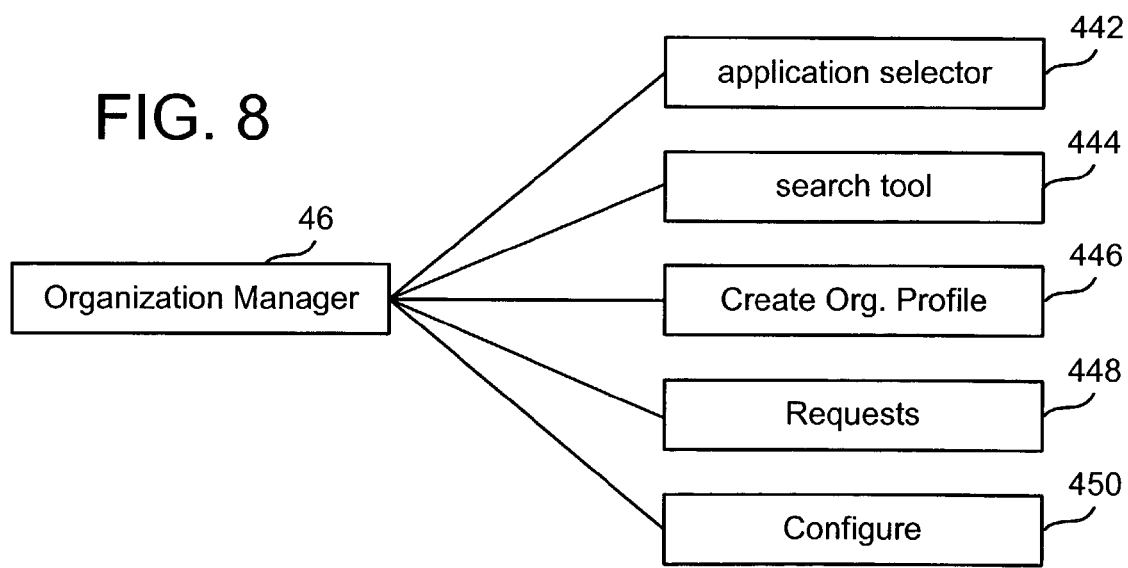

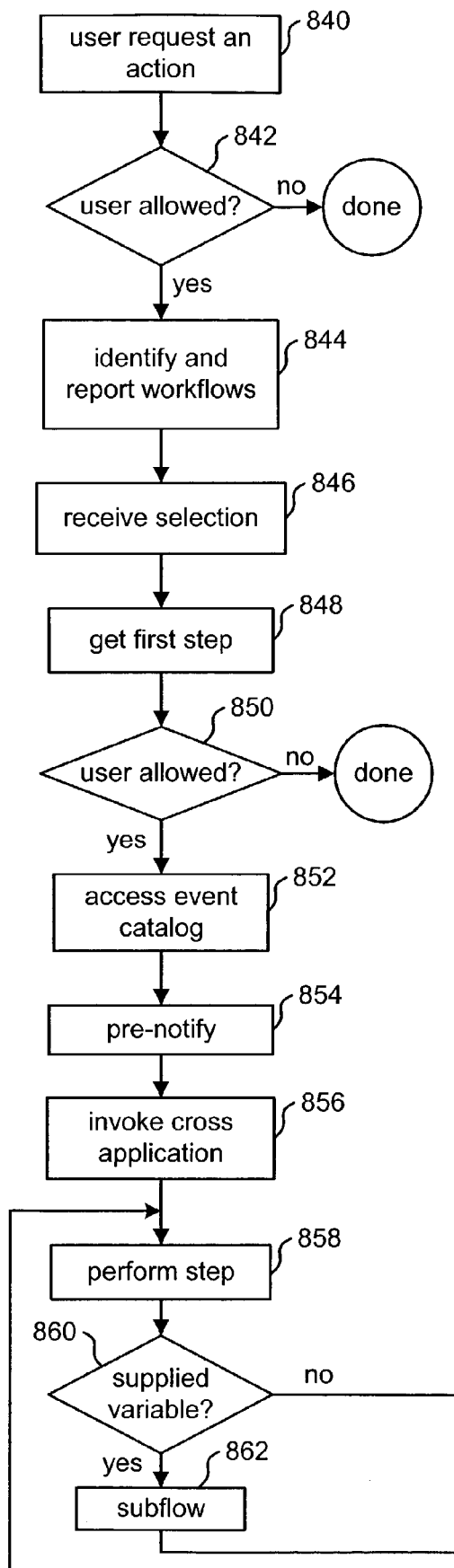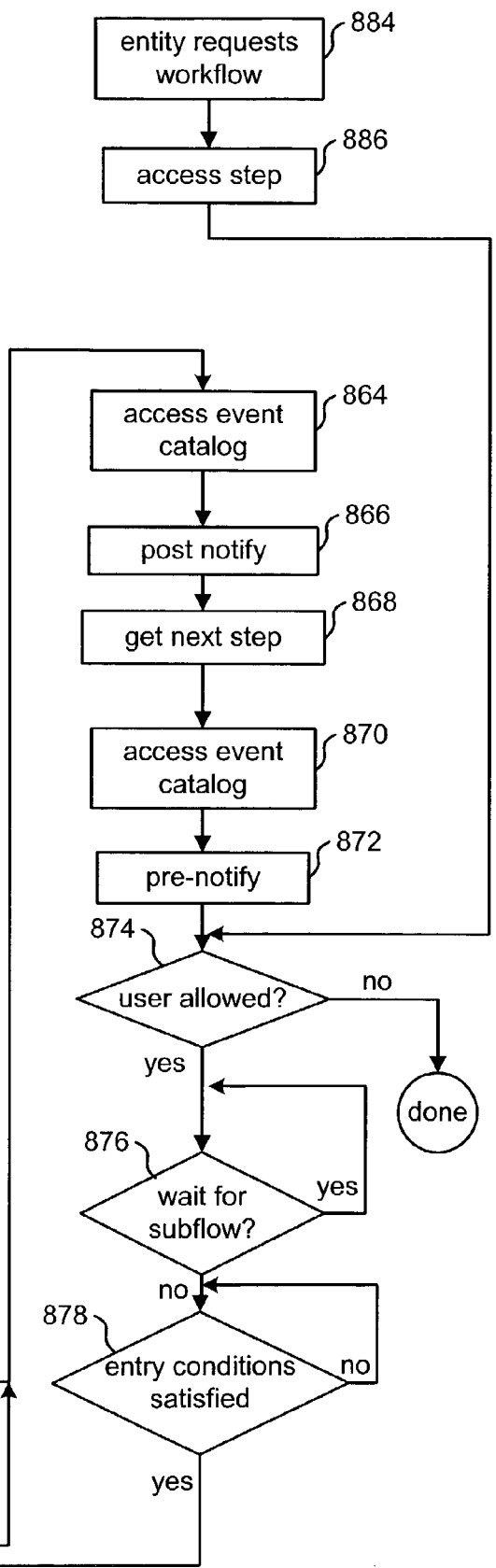
FIG. 16

METHOD AND APPARATUS FOR PROVISIONING TASKS USING A PROVISIONING BRIDGE SERVER

COPYRIGHT NOTICE

A portion of the disclosure of this patent document contains material, which is subject to copyright protection. The copyright owner has no objection to the reproduction by anyone of the patent document or the patent disclosure as it appears in the United States Patent and Trademark Office patent file or records, but otherwise reserves all copyright rights whatsoever.

CROSS-REFERENCE TO RELATED APPLICATIONS

This Application is related to the following Applications:

"Determining Group Membership," by Shawn P. Delany, Sajeed Abmed, and Vivian M. Ganitsky, U.S. patent application Ser. No. 09/998,926, filed Nov. 30, 2001;

"Determining A User's Groups", by Shawn P. Delany and Sajeed Ahmed, U.S. patent application Ser. No. 09/999,177, filed Nov. 30, 2001 now U.S. Pat. No. 7,085,834;

"Policies for Modifying Group Membership", by Shawn P. Delany, Sajeed Abmed and Vivian M. Ganitsky, U.S. patent application Ser. No. 09/998,898, filed Nov. 30, 2001;

"Runtime Modification of Entries In An Identity System", by Shawn P. Delany and Sajeed Abmed, U.S. patent application Ser. No. 09/997,409, filed Nov. 30, 2001; and "Employing Job Code Attributes In Provisioning", by Richard Sinn, U.S. patent application Ser. No. 10/145,684, filed the same day as the present application, May 15, 2002.

Each of these related Applications are incorporated herein by reference.

BACKGROUND OF THE INVENTION

1. Field of the Invention

The present invention is directed to technology for provisioning tasks.

2. Description of the Related Art

Identity Systems have become more popular with the growth of the Internet, network use, and other information technologies. In general, an Identity System provides for the creation, removal, editing and other managing of identity information stored in various types of data stores. The identity information pertains to entities, such as users, groups, organizations and/or things. The data store maintains a set of attributes for each entity. For example, the attributes stored for a user may include a name, address, employee number, telephone number, email address, user ID and password. The Identity System can also manage access privileges that govern what an entity can view, create, modify or use in the Identity System. Often, this management of access privileges is based on one or more attributes.

Entities managed by the Identity System may require access to a variety of resources that are external to the Identity System. For example, a user may need a telephone connection and accounts on various computer systems. A person working as an Identity System administrator can manually submit a request for the necessary external resources to one or more external provisioning systems.

A provisioning system services resource requests by establishing external resource access for an entity, such as an Identity System user. Most provisioning systems include one or more agents with each agent corresponding to an external resource. For each requested resource, the provisioning system assigns an agent to make the resource available to a specified entity. In one example, the provisioning system receives a request to establish a computer system account and telephone connection for a user. The provisioning system assigns one agent to create the computer account and another agent to create the telephone connection. Provisioning systems are also capable of terminating an entity's resource access.

An Identity System administrator is often required to manually interface with multiple provisioning systems, because no one provisioning system supports all of the external resources required by the administrator. Each provisioning system can have a different user interface and manner of operation—placing an undesirable burden on the Identity System administrator. The separate provisioning systems may not be able to communicate with each other to support possible interdependencies in resource assignments—creating logistical difficulties for the Identity System administrator.

SUMMARY OF THE INVENTION

The present invention, roughly described, pertains to technology for enabling automated interaction with provisioning systems.

In one implementation, one or more job code attributes are associated with an entity managed by an Identity System. A job code attribute corresponds to a set of external resources the entity needs. For example, a user may be added to an engineering group in the Identity System. The Identity System assigns the user a job code attribute indicating that the user needs an account on the engineering computer system and a telephone connection.

In one embodiment, the Identity System is in communication with one or more provisioning systems. The Identity System determines whether an entity's job code attribute is supported by the provisioning systems. The Identity System also provisions resource related tasks based on the job code attribute to appropriate provisioning systems—providing or eliminating resource access for an Identity System entity. For the example above, the Identity System ensures that the provisioning systems support the tasks of creating an engineering computer account and setting up a telephone connection. The Identity System then provisions these tasks among the provisioning systems.

One implementation of the Identity System includes a Provisioning Bridge Server to manage communications with the provisioning systems—enabling the Identity System to automate the use of multiple provisioning systems. The Provisioning Bridge Server maintains a set of control information that lists characteristics for each job code attribute—enabling job code attributes to be continually updated based on Identity System and provisioning system changes. In one instance, the listed characteristics for a job code attribute include a job code, targeted resources for the job code, whether approval is required to gain access to the resources, and the provisioning system supporting each of the listed resources. The Provisioning Bridge Server uses this information to perform the operations of ensuring that job code attributes are supported and provisioning tasks in response to job code attributes.

In further embodiments of the present invention, automated job code based provisioning is employed in processing environments other than an Identity System. Providing automated job code based provisioning can have broad applicability to enhance the performance of many different server based systems.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 7 is a block diagram depicting the Group Manager.

FIG. 8 is a block diagram depicting the Organization Manager.

FIG. 16 is a flow chart describing one embodiment of a process for using a workflow.

DETAILED DESCRIPTION

Figure 1:
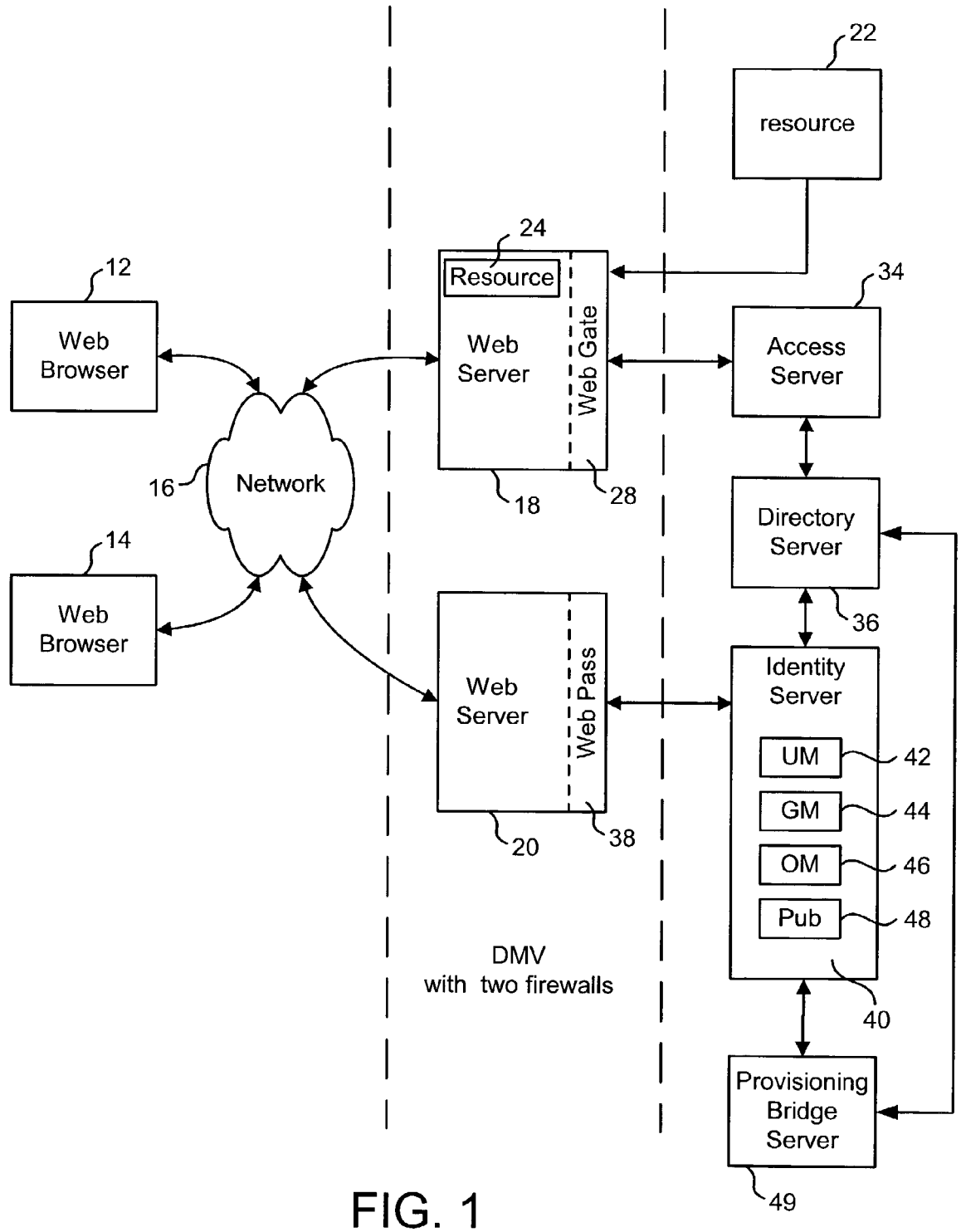
FIG. 1 is a block diagram depicting the components of one embodiment of an access management system.

FIG. 1 depicts one implementation of an access management system, which provides identity management services and/or access management services for a network. The identity management portion of the system (hereinafter "the Identity System") manages identity profiles, while the access management portion of the system (hereinafter "the Access System") provides security for resources across one or more Web Servers. A key feature of one embodiment of this system is the centralization of the repositories for policies and user identity profiles, while decentralizing their administration. That is, one embodiment of the system centralizes the policy and identity repositories by building them on a directory service technology. The system decentralizes their administration by hierarchy delegating administrative roles. Although the system of FIG. 1 includes an Identity System and an Access System, other embodiments may only include an Identity System or only include an Access System.

FIG. 1 is a block diagram depicting one embodiment for deploying an integrated Identity System and Access System. FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server 20 using HTTP over the Internet; however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 16 and 18 and Access Server 34/Identity Server 40.

FIG. 1 shows two types of addressable resources: resource 22 and resource 24. Resource 22 is external to Web Server 18 but can be accessed through Web Server 18. Resource 24 is located on Web Server 18. An addressable resource can be anything that is possible to address with a uniform resource locator (URL, see RFC 1738). An addressable resource can include a web page, software application, file, database, directory, a data unit, etc. In one embodiment, an addressable resource is anything accessible to a user on a network. The network could be the Internet, a LAN, a WAN, or any other type of network. Table 1, below, provides examples of addressable resources and at least a portion of their respective URL syntax:

TABLE 1

| Resource | URL Encoding |
| --- | --- |
| Directory | /Sales/ |
| HTML Page | /Sales/Collateral/index.html |
| CGI Script with no query | /cgi-bin/testscript.cgi |
| CGI Script with query | /cgi_bin/testscript.cgi?button=on |
| Application | /apps/myapp.exe |

A URL includes two main components: a protocol identifier and a resource name separated from the protocol identifier by a colon and two forward slashes. The protocol identifier indicates the protocol used to fetch the named resource. Examples of protocols include HTTP, FTP, Gopher, File and News. The resource name is the complete address to the resource. The format of the resource name depends on the protocol. For HTTP, the resource name includes a host name, a file name, a port number (optional) and a reference (optional). The host name is the name of the machine on which the resource resides. The file name is the path name to the file on the machine. The port number is the number of the port to which to connect. A reference is a named anchor within a resource that usually identifies a specific location within a file. Consider the following URL:

"http://www.oblix.com/oblix/sales/index.html."

The string "http" is the protocol identifier. The string "www.oblix.com" is the host name. The string "/oblix/sales/index.html" is the file name.

A complete path, or a cropped portion thereof, is called a URL prefix. In the URL above, the string "/oblix/sales/index.html" is a URL prefix and the string "/oblix" is also a URL prefix. The portion of the URL to the right of the host name and to the left of a query string (e.g. to the left of a question mark, if there is a query string) is called the absolute path. In the URL above, "/oblix/sales/index.html" is the absolute path. A URL can also include query data, which is typically information following a question mark. For example, in the URL:

http://www.oblix.com/oblix/sales/
index.html?user=smith&dept=sales the query data is "user=smith&dept=sales." Although the discussion herein refers to URLs to identify a resource, other identifiers can also be used within the spirit of the present invention.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory Server 36.

The Access System includes Access Server 34, Web Gate 28, and Directory Server 36. Access Server 34 provides authentication, authorization, auditing logging services. It further provides for identity profiles to be used across multiple domains and Web Servers from a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40, Directory Server 36, and Provisioning Bridge Server 49. Identity Server 40 manages identity profiles. An identity profile is a set of information associated with a particular entity (e.g. user, group, organization, etc.). The data elements of the identity profile are called attributes, which are discussed in more detail below. An attribute may include a name, value and access criteria. The Identity Server includes three main applications, which effectively handle the identity profiles and privileges of the user population: User Manager 42, Group Manager 44, and Organization Manager 46. User Manager 42 manages the identity profiles for individual users. Group Manager 44 manages identity profiles for groups. Organization Manager 46 manages identity profiles for organizations. Identity Server 40 also includes Publisher 48, an application that enables entities to quickly locate and graphically view information stored by Directory Server 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Multi-level delegation features also simplify individual user management. Companies can assign the responsibility for maintaining user identity data to the people closest to it. For example, individual users can be allowed to: (1) add themselves to the user directory by filling out customized forms, (2) modify personal or professional information about themselves (such as addresses, personal preferences, or name changes), (3) change a piece of information in their identity profiles that can determine their access rights, or (4) allow someone else to log in as their temporary substitute while they are out of the office or on vacation. Likewise, any number of delegated administrators (both inside and outside the company) can be given the authority to: (1) create and delete users in the user directory, (2) approve a change that a user has requested, and (3) change the information about users to grant or revoke services. An administrator can be delegated any allowed degree of responsibility. For example, a company might decide that only IT staff can assign application access, whereas department managers can add new users.

External legacy systems—such as human resource management systems—can be allowed to trigger automated workflows. With this feature, a new user could be created, a departing employee could be deleted, or certain services could be granted or revoked following an event change in an external system.

The Identity System also provides for self-registration. User Manager 42 enables an individual to self-register in situations when it's appropriate. User Manager 42 then authorizes delegated administrators to verify the individual's information and approve or deny the registration requests. In one embodiment, self-registration is defined by a customizable, multi-step workflow.

Group Manager 44 allows entities to create, delete and manage groups of users who need identical access privileges to a specific resource or set of resources. Managing and controlling privileges for a group of related people—rather than handling their needs individually—yields valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups; and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets companies form dynamic groups specified by an LDAP filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third application in the Identity System, Organization Manager 46, streamlines the management of large numbers of organizations within an e-business network, including partners, suppliers, or even major internal organizations such as sales offices and business units. Certain infrastructure security and management operations are best handled—or can only be handled—at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

Provisioning Bridge Server 49 provisions tasks among provisioning systems (not shown) external to the Identity System. In one embodiment, Provisioning Bridge Server 49 supports multiple provisioning systems. Provisioning Bridge System 49 is in communication with Identity Server 40 and Directory Server 36—receiving task requests from Identity Server 40 and maintaining control information in Directory Server 36. The tasks provisioned by Provisioning Bridge Server 49 provide or remove external resource access for entities managed by the Identity System, such as users. Examples of external resources include computer and telephone systems. Greater details about Provisioning Bridge Server 49 are provided below.

The system of FIG. 1 can be used to protect a web site, network, Intranet, Extranet, etc. To understand how the system of FIG. 1 protects a web site (or other structure), it is important to understand the operation of unprotected web sites. In a typical unprotected web site, end users cause their browsers to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory Server 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information. The received log-on information is then passed back to Web Server 18 and on to Web Gate 28.

Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory Server 36. If the user's supplied log-on information satisfies the authentication criteria, the process flows as described below; otherwise, the end user is notified that access to the requested resource is denied and the process halts. After authenticating the user, Web Gate 28 queries Access Server 34 about whether the user is authorized to access the resource requested. Access Server 34 in turn queries Directory Server 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. There are two levels of rules available (first and second levels) for authentication, authorization, and auditing. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

The system of FIG. 1 is scalable. There can be many Web Servers, many Access Servers, and many Identity Servers. In one embodiment, Directory Server 36 is an LDAP Directory Server and communicates with other servers/modules using LDAP over SSL. In other embodiments, Directory Server 36 can implement other protocols or can be other types of data repositories (e.g. SQL, etc.). Many variations of the system of FIG. 1 can be used with the present invention. For example, instead of accessing the system with a web browser, an API can be used. Alternatively, portions of functionality of the present invention can be separated into independent programs that can be accessed with a URL.

Figure 2:
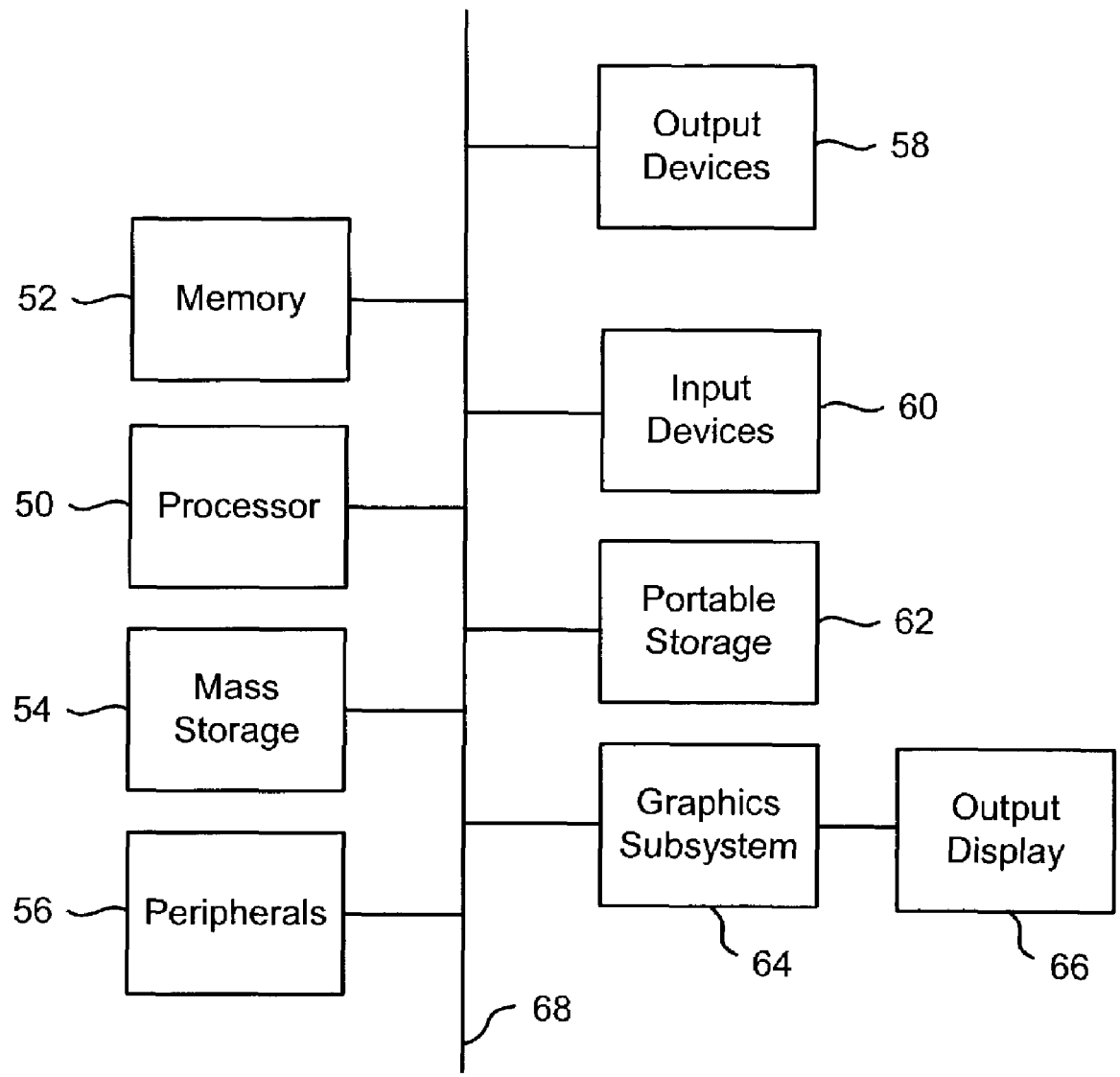
FIG. 2 is a block diagram depicting exemplar components of a computing system that can be used to implement the present invention.

FIG. 2 illustrates a high level block diagram of a computer system that can be used for the components of the present invention. The computer system in FIG. 2 includes processor unit 50 and main memory 52. Processor unit 50 may contain a single microprocessor, or may contain a plurality of microprocessors for configuring the computer system as a multi-processor system. Main memory 52 stores, in part, instructions and data for execution by processor unit 50. If the system of the present invention is wholly or partially implemented in software, main memory 52 can store the executable code when in operation. Main memory 52 may include banks of dynamic random access memory (DRAM) as well as high speed cache memory.

The system of FIG. 2 further includes mass storage device 54, peripheral device(s) 56, user input device(s) 60, portable storage medium drive(s) 62, graphics subsystem 64, and output display 66. For purposes of simplicity, the components shown in FIG. 2 are depicted as being connected via a single bus 68. However, the components may be connected through one or more data transport means. For example, processor unit 50 and main memory 52 may be connected via a local microprocessor bus, and the mass storage device 54, peripheral device(s) 56, portable storage medium drive(s) 62, and graphics subsystem 64 may be connected via one or more input/output (I/O) buses. Mass storage device 54, which may be implemented with a magnetic disk drive or an optical disk drive, is a non-volatile storage device for storing data and instructions for use by processor unit 50. In one embodiment, mass storage device 54 stores the system software for implementing the present invention for purposes of loading to main memory 52.

Portable storage medium drive 62 operates in conjunction with a portable non-volatile storage medium, such as a floppy disk, to input and output data and code to and from the computer system of FIG. 2. In one embodiment, the system software for implementing the present invention is stored on such a portable medium, and is input to the computer system via the portable storage medium drive 62. Peripheral device(s) 56 may include any type of computer support device, such as an input/output (I/O) interface, to add additional functionality to the computer system. For example, peripheral device(s) 56 may include a network interface for connecting the computer system to a network, a modem, a router, etc.

User input device(s) 60 provide a portion of a user interface. User input device(s) 60 may include an alpha-numeric keypad for inputting alpha-numeric and other information, or a pointing device, such as a mouse, a trackball, stylus, or cursor direction keys. In order to display textual and graphical information, the computer system of FIG. 2 includes graphics subsystem 64 and output display 66. Output display 66 may include a cathode ray tube (CRT) display, liquid crystal display (LCD) or other suitable display device. Graphics subsystem 64 receives textual and graphical information, and processes the information for output to display 66. Additionally, the system of FIG. 2 includes output devices 58. Examples of suitable output devices include speakers, printers, network interfaces, monitors, etc.

The components contained in the computer system of FIG. 2 are those typically found in computer systems suitable for use with the present invention, and are intended to represent a broad category of such computer components that are well known in the art. Thus, the computer system of FIG. 2 can be a personal computer, handheld computing device, Internet-enabled telephone, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The basic unit of information store in a directory is called an entry, which is a collection of information about an object. The information in an entry often describes a real-world object such as a person, but this is not required. A typical directory includes many entries that correspond to people, departments, servers, printers, and other real-world objects in the organization served by the directory.

An entry is composed of a set of attributes, each of which describes one particular trait of the object. Each attribute has a type, one or more values, and associated access criteria. The type describes the kind of information contained in the attribute, and the value contains the actual data.

An entry in the directory has a set of attributes that are required and a set of attributes that are allowed. For example, an entry describing a person is required to have a cn (common name) attribute and an sn (surname) attribute. One example of an allowed attribute may be a nickname. Any attribute not explicitly required or allowed is prohibited. The collections of all information about required and allowed attributes are called the directory schemas.

Examples of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, department number, department URL, skills, projects currently working on, past projects, home telephone, home address, birthday, previous employers, job code, and anything else desired to be stored by an administrator. Examples of attributes stored in a group identity profile include: owner, name, description, static members, dynamic member rule, subscription policies, etc. Examples of attributes stored in a user organization identity profile include: owner, name, description, business category, address, country, etc. In other embodiments, less or more than the above-listed information is stored.

Figure 3:
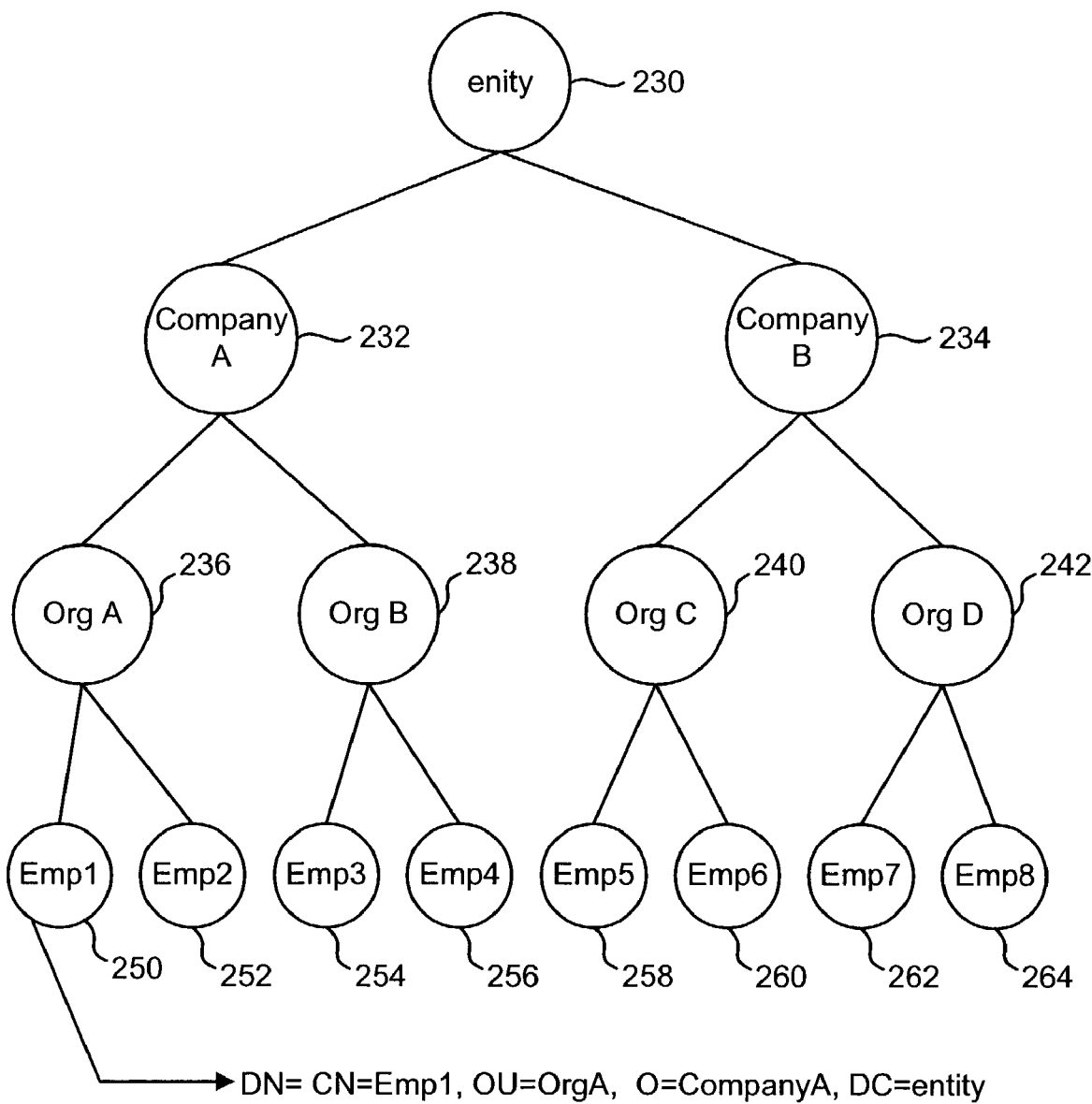
FIG. 3 is an example of a directory tree structure.

FIG. 3 depicts an exemplar directory tree that can be stored on Directory Server 36. Each node on the tree is an entry in the directory structure that includes an identity profile. In one embodiment, the entity can be a user, group or organization. Node 230 is the highest node on the tree and represents an entity responsible for the directory structure. In one example, an entity may set up an Extranet and grant Extranet access to many different companies. The entity setting up the Extranet is node 230. Each of the companies with Extranet access would have a node at a level below node 230. For example, company A (node 232) and company B (node 234) are directly below node 230. Each company may be broken up into organizations. The organizations could be departments in the company or logical groups to help manage the users. For example, FIG. 3 shows company A broken up into two organizations: organization A with node 236 and organization B with node 238. Company B is shown to be broken up into two organizations: organization C with node 240 and organization D with node 242. FIG. 3 shows organization A having two end users: employee 1 with node 250 and employee 2 with node 252. Organization B is shown with two end users: employee 3 with node 254 and employee 4 with node 256. Organization C is shown with two end users: employee 5 with node 258 and employee 6 with node 260. Organization D is shown with two end users: employee 7 with node 262 and employee 8 with node 264.

Each entity has a distinguished name (DN), which uniquely identifies the node. In one embodiment, each entry also has a relative name, which is different from all other relevant names on the same level of the hierarchy. In one implementation, the distinguished name (DN) comprises a union of the relative names up the tree through to the entity. For example, the distinguished name of employee 1 (node 250) is DN=CN=Empl, OU=OrgA, O=CompanyA, DC=entity, where:
    DC=Domain Component
    O=Organization
    OU=Organizational Unit
    CN=common name.

FIG. 3 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

There are many ways for an entity to access and use the Identity System. In one embodiment, the entity can access the Identity Systems services using a browser. In other embodiments, XML documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System. Alternatively, the Access System can be bypassed (or there may be no Access System) and the Identity System authenticates the user.

Figure 4:
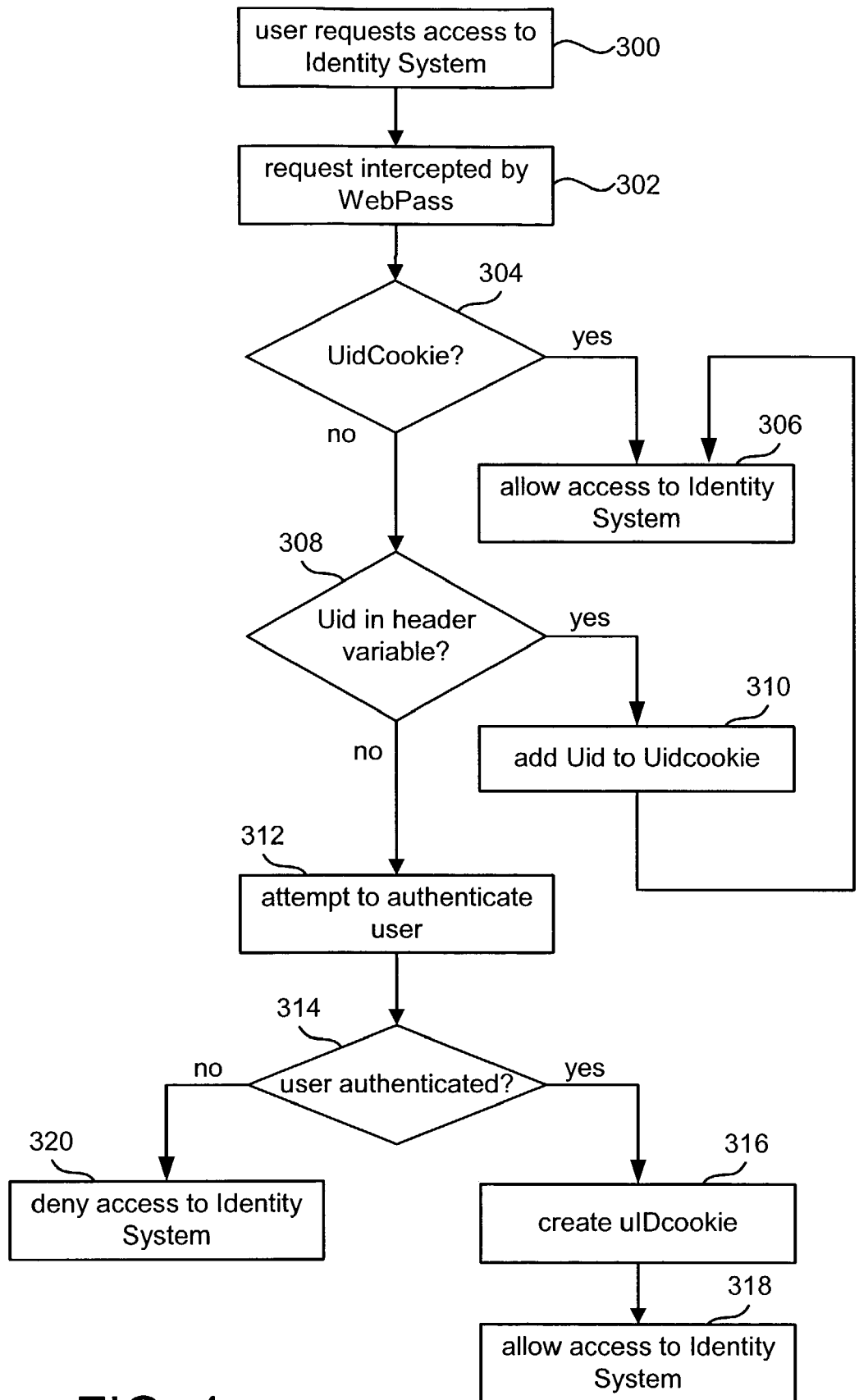
FIG. 4 is a flow chart describing one embodiment of a process for accessing the Identity System.

FIG. 4 is a flowchart, which describes a process of entering the Identity System. In step 300 the user requests access to the Identity System. For example, the user can point a browser to Identity Server 40. After being provided with a login page, the user fills in the login information, and that information is sent back to the system. If there is an Access System, as described below, then the user will be authenticated and authorized by the Access System. After authorization, the request will be redirected from the Access System to Web Server 20 (see FIG. 1). If there is no Access System, or if the Access System is not providing authentication and/or authorization services, the browser can initially be pointed directly to Web Server 20. Other alternatives can also be supported. Upon the request being sent to Web Server 20, the request will be intercepted by Web Pass 38 in step 302. In step 304, it is determined whether there is an Identity System UidCookie. The UidCookie is stored on the user's system and can be provided with the request.

Figure 5:
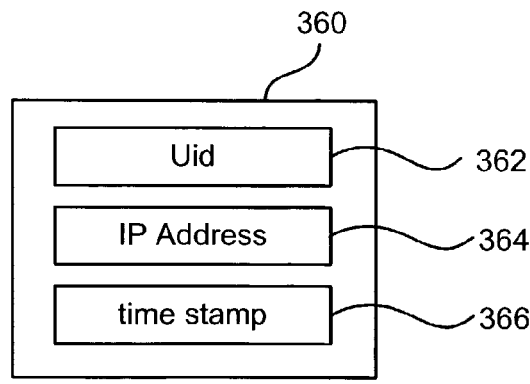
FIG. 5 is a block diagram of a cookie.

FIG. 5 depicts an example of UidCookie 360. A cookie is information that a web page, system or addressable resource stores on a client device. In some embodiments it can represent information about the user, regardless of where it is stored and in what format. This cookie includes at least three components: Uid 362, IP address 364 and timestamp 366. Uid 362 stores the user identification for the entity trying to access the Identity System. IP address 364 is the IP address of the machine that the user is currently using. Timestamp 366 indicates the time that the cookie was initially created. Some embodiments use timestamp 366 to limit the life of the cookie. Some embodiments do not use timestamp 366. In one embodiment, the cookie is encrypted.

If, in step 304, it is determined that a valid UidCookie exists, then, in step 306, the user is given access to the Identity System application requested. The Uid from the cookie is used as the user identification upon entering the Identity System. If the valid UidCookie does not exist (step 304), then it is determined whether a user identification was received in a header variable. In one embodiment using an integrated Access and Identity System, a user's request to access the Identity System will be authenticated and authorized by the Access System. After authentication and/or authorization, the HTTP request will be redirected to the Identity System. This redirected HTTP request will include a header variable labeled as "userAuth." The data associated with this header variable will indicate the user identification for the user. If the user identification was in a header variable then a UidCookie is created in step 310 and that user identification is added to the UidCookie. Subsequent to step 310, the user is provided access to the Identity System in step 306.

If the user identification was not in a header variable, then the system attempts to authenticate the user in step 312. That is, the user's user name and password provided by the login page are used to access Directory Server 36 in order to authenticate the user. More information about authentication is described below. If the user is properly authenticated, then a UidCookie is created in step 316. During an authentication process, the user's ID and password were used to access the user's identity profile in Directory Server 36. That identity profile will include a user identification, which is added to the UidCookie in step 316. In one embodiment, the user identification is the user's distinguished name. In step 318, the user is provided access to the Identity System. If the user was not properly authenticated, then the user is denied access to the Identity System in step 320.

As discussed above, when requesting access to the Identity System, the user selects which of the Identity System applications (User Manager 42, Group Manager 44, Organization Manager 46 or Publisher 48) the user wishes to access. In one embodiment, the login page for the Identity System will request an ID, a password, an indication of the application requested and an indication of a role (discussed below). After appropriate authentication and authorization, the user is provided with a home page for User Manager 42, a home page for Group Manager 44, a home page for Organization Manager 46 or a home page for Publisher 48, depending upon which application was selected by the user. From the home page, the user can access the various services of the application.

Figure 6:
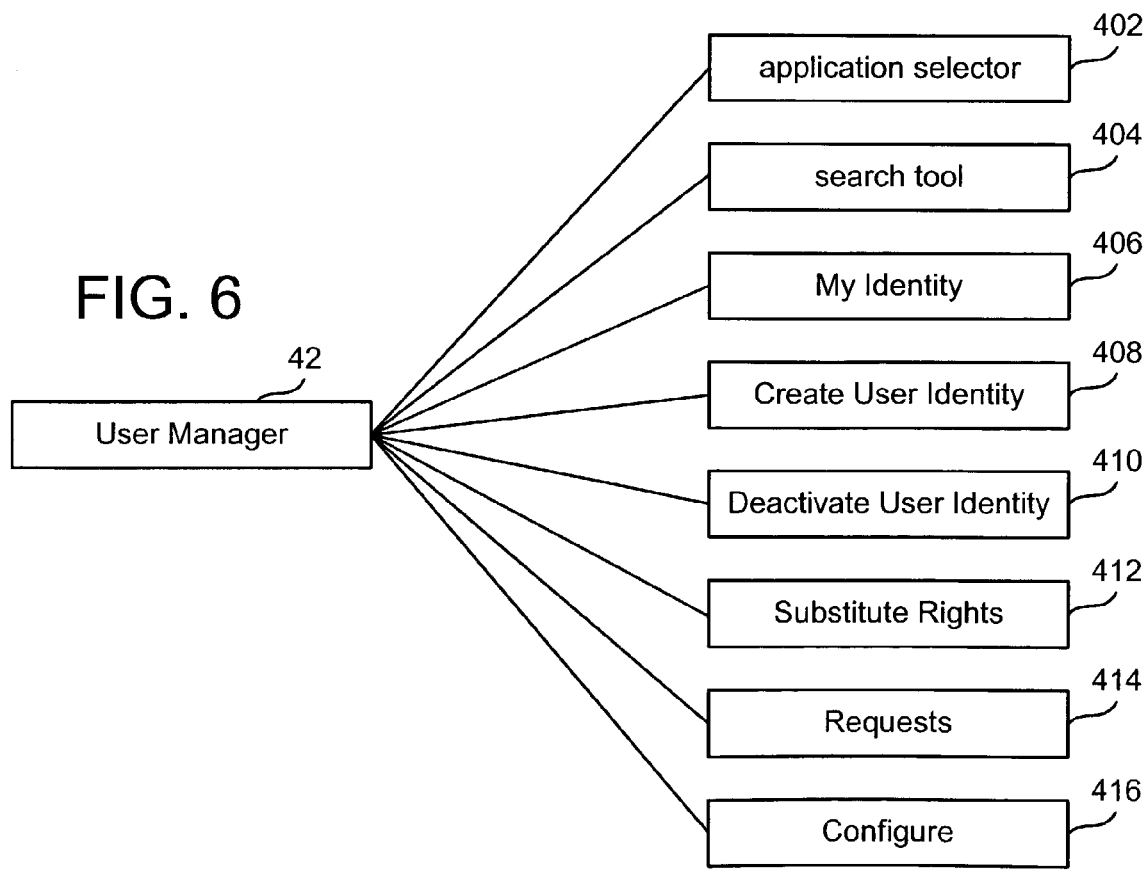
FIG. 6 is a block diagram depicting the User Manager.

FIG. 6 graphically depicts the various services provided by User Manager 42. Each of these services can be accessed from the User Manager home page. For example, in one embodiment, the home page will include an application selector 402, search tool 404, My Identity tab 406, Create User Identity tab 408, Deactivate User Identity tab 410, Substitute Rights tab 412, Requests tab 414 and Configure tab 416. Application selector 402 lets the user change applications from the User Manager to either the Group Manager, Object Manager or Publisher. In one embodiment, application selector 402 is a drop down menu. Search tool 404 enables a user to provide search information in order to search the directory for a set of one or more user identity profiles.

By selecting My Identity tab 406, a user is provided with the information stored in that user's identity profile. Create User Identity tab 408 allows a user with the appropriate privileges to create a new user identity profile (e.g. with a workflow). Deactivate User Identity tab 410 allows a user with proper privileges to remove an identity profile from the directory. Substitute Rights tab 412 allows the user to indicate who can proxy that user and allows the user to be a proxy for someone else. Request tab 414 allows a user to monitor workflows that are in progress or recently completed. Depending on the user's privileges, by selecting request tab 414, the user can see all workflows that involve that user, that are started by that user, that affect that user or that the user has privileges to view. Request tab 414 will indicate workflows for which there is an outstanding action to be done by the current user. The user can select that workflow and perform the task.

Configure tab 416 allows a user to configure various options for User Manger 42. The user must have sufficient privileges to access Configure tab 416. The user can perform attribute access control, delegate administration, define workflows and set the search base. Attribute access control includes controlling who has view and modify permissions for each attribute. Attributes can be set at any and all levels in an organization. The configuration also allows the specification of an e-mail notification list when a change to an attribute is requested. Delegation administration includes delegating administrative tasks to local administrators. An entity can choose what rights to delegate, whom to delegate to, and the scope to delegate. Workflow definition includes defining workflows for a particular organization, defining who will be responsible for the workflow actions and/or defining who will be receiving notifications for the workflow actions. Setting the search base includes setting the search base for a particular organization, person or set of persons. This will localize access to ensure security.

FIG. 7 depicts the various services provided by Group Manager 44. Once an entity is at the Group Manager home page, the entity can access the application selector 430, search tool 432, My Groups tab 434, Create Groups tab 436, Request tab 438 and Configure tab 440. My Groups tab 434 indicates the groups of which the entity is a member. By selecting any of the groups identified by My Groups tab 434 or Search Tool 432, the user will be provided with the identity profile page for that particular group. From the profile page, the group can be modified or deleted. Create groups tab 436 allows the user to create a new group. Request tab 438 provides the user with access to currently pending and recently finished workflows that involve groups. Configure tab 440 allows the user to configure various information about groups in the Group Manager. While viewing the identity profile for a group, the entity can modify that profile if the entity has appropriate privileges.

Configure tab 440 allows an entity to provide attribute access control, delegate rights, define workflows and expand dynamic groups. Attribute access control includes controlling who has view and modify permissions for each attribute in group identity profiles. Additionally, e-mail notification lists can be created which are used to notify entities when a change to an attribute is requested. Administration tasks can be delegated to local administrators. An entity can choose what rights to delegate, who to delegate to, and what the scope of the delegation is. Workflow definition includes defining the workflows for a particular group. This includes defining who is responsible for the workflow actions and who will be receiving notifications for workflow actions. Note that some of the tabs and services may not be available to all entities, depending upon the privileges of those entities.

FIG. 8 depicts the services provided by Organization Manager 46. Organization manager 46 provides functionality to create, modify, delete and manage organizational objects. From the home page for Organization Manager 46, a user is provided with an application selector 442, search tool 444, Create Organizational Profile tab 446, Request tab 448 and Configure tab 450. Application selector 442 allows the user to select a different application to access. Search tool 444 provides a user with the ability to enter search terms in order to search for one or more organizational objects. After performing a search, the user will be provided with a list of organizational objects meeting the search requirements. Users can select any of these objects to view, modify or delete, if the user has sufficient privileges.

Create Organizational Profile tab 446 allows a user to create new organizational objects, if the user has sufficient privileges. Request tab 448 allows a user to access pending workflows and workflows that have recently been finished that relate to organizational objects. Access to Request tab 448 can be restricted and/or limited depending upon users privileges. If a user has a step to perform for a workflow, it will be indicated by Request tab 448.

Configure tab 450 allows the entity to perform attribute access control, delegate administration, define workflows and define container limits. Attribute access control includes controlling who has view and modify permissions for each attribute of an organizational identity profile. In addition, an entity can specify an e-mail notification list when a change to an attribute is requested. Delegating administration includes delegating administrative tasks to local administrators. An entity can choose what rights to delegate, whom to delegate to, and the scope of the delegation. Workflow definition includes defining the workflows for a particular organization, including who will be responsible for the workflow actions and who will be receiving notifications for the workflow. Container limits includes controlling how many objects can be created in an organization. This would also include defining who will be receiving notifications that a container limit has been met, has been violated or is close to being met.

As discussed above, user identity profiles, group identity profiles and organization identity profiles all contain attributes. In the various services provided by User Manager, Group Manager and Organization Manager, users with the appropriate privileges can configure the rights to access each of the attributes.

Figure 9:
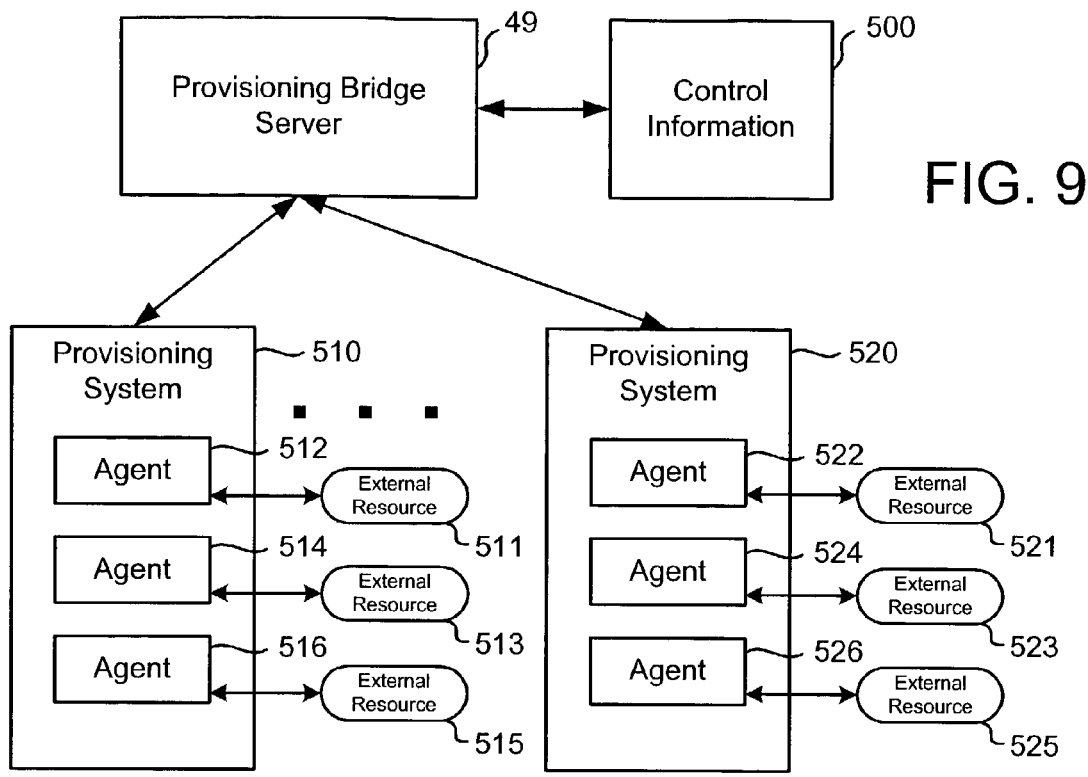
FIG. 9 is a block diagram depicting a Provisioning Bridge Server in operation with control information and provisioning systems.

FIG. 9 depicts a block diagram of Provisioning Bridge Server 49 in operation. Provisioning Bridge Server 49 is in communication with control information 500 and a set of provisioning systems, including provisioning systems 510 and 520. In one embodiment, control information 500 is maintained in Directory Server 36. In another embodiment, control information 500 is maintained in a memory separate from Directory Server 36. Provisioning systems 510 and 520 are external to the Identity System in one implementation. In one such implementation, provisioning systems 510 and 520 communicate with Provisioning Bridge Server 49 through a communications link, such as a local area network or wide area network connection. Those skilled in the art recognize that many different types of communication mediums are suitable for facilitating communication between Provisioning Bridge Server 49 and provisioning systems 510 and 520. In another implementation, functionality may be included within the Identity System to perform the operation of a provisioning system.

Provisioning system 510 includes agents 512, 514, and 516. Provisioning system 520 includes agents 522, 524, and 526. Provisioning systems 510 and 520 receive requests from Provisioning Bridge Server 49 to allocate or eliminate access to external resources for entities managed by the Identity System, such as users. Examples of external resources include applications and operating systems on computer systems and telephone connections. Provisioning systems 510 and 520 delegate each request they receive to an agent that is adapted to interface with the requested resource. Provisioning system 510 may allocate a task to agent 512, 514, or 516. Provisioning system 520 may allocate a task to agent 522, 524, or 526. As shown in FIG. 9, agents 512, 514, and 516 support external resources 511, 513, and 515, respectively. Agents 522, 524, and 526 support external resources 521, 523, and 525, respectively.

Multiple provisioning systems may be required to support all of the resources employed by the Identity System's entities. For example, provisioning system 510 may only have agents that interface with engineering related external resources, and provisioning system 520 may only have agents that interface with marketing related external resources. In one example, provisioning system 510 employs agents 512, 514, and 516 to provide and remove access to engineering related resources 511, 513, and 515. Provisioning system 520 employs agents 522, 524, and 526 to provide and remove access to marketing related external resources 521, 523, and 525.

Provisioning Bridge Server 49 facilitates the Identity System's automated use of multiple provisioning systems 510 and 520. Provisioning Bridge Server 49 maintains control information 500, which correlates the external resources used by Identity System entities with the various provisioning systems. During operation the Identity System may need to have a resource related task performed, such as providing an entity with access to a resource or eliminating an entity's access to a resource. Provisioning Bridge Server 49 identifies the proper provisioning system for performing the resource related task and submits a request to the proper provisioning system to perform the task. Provisioning Bridge Server 49 employs control information 500 to identify the proper provisioning system for performing the desired task.

In one implementation, control information 500 includes entries with the following fields: 1) Job Code—identifying a classification assigned to an entity in the Identity System based on the entity's role in one or more organizations; 2) Target—identifying an external resource corresponding to the Job Code; 3) Type—identifying a type of service the Target resource provides for the Job Code; 4) Approval—indicating whether approval is required to provide or eliminate access to the resource Target and Type for the Job Code; and 5) PS—identifying the provisioning system that supports the resource Target and Type. This only provides one example of fields for control information 500. Alternate embodiments of control information 500 may include numerous other configurations that correlate job codes, external resources, and provisioning systems.

Table 2 below shows one example of content in control information 500 having the fields described above:

TABLE 2

| Job Code | Target | Type | Approval | PS |
| --- | --- | --- | --- | --- |
| A | System 1 | Engineering Applications | Yes | Provisioning System 510 |
| A | System 2 | E-mail | Yes | Provisioning System 520 |
| B | System 3 | Marketing Applications | Yes | Provisioning System 520 |
| A | System 1 | Legal Applications | No | Provisioning System 510 |

Table 2 shows that Provisioning Bridge Server 49 needs to arrange for entities with Job Code A to receive the following: 1) accounts on computer system 1 for performing legal applications and engineering applications, and 2) an account on computer system 2 to perform e-mail applications. Approval must be obtained before gaining access to the engineering applications and e-mail. Provisioning Bridge Server 49 goes through provisioning system 510 for the engineering and legal applications and provisioning system 520 for the e-mail. Entities with Job Code B receive accounts for performing marketing applications on computer system 3 after obtaining approval. Provisioning Bridge Server 49 goes through provisioning system 520 for the marketing applications. Engineering applications may include design and simulation software among other things. Marketing applications may include inventory and order tracking software among other things. Legal applications may include docketing software among other things. In the example from Table 2, Job Code A could be assigned to an entity with a role related to engineering and legal groups within an organization. Job Code B could be assigned to an entity with a role related to a marketing group within an organization.

By employing job codes, the Identity System can provide entities, such as users, with a label that corresponds to the external resources the entity needs. The Identity System can assign job codes to an entity based on the role the entity plays in the organization managed by the Identity System. In one implementation the Identity System sets job codes for an entity based on the groups to which the entity belongs. In one embodiment, the Identity System associates a job code attribute with an entity to identify all of the entity's job codes.

In some instances, an entity may have multiple job codes nested within the job code attribute. For example, an organization's Chief Executive Officer may need access to the resources available to multiple groups within the organization, such as a finance group and an engineering group. In this case, the Chief Executive Officer's job code attribute includes a nested job code assigned to members of the finance group and a nested job code assigned to members of the engineering group. In another embodiment, an entity can be associated with multiple job code attributes each corresponding to a single job code.

Figure 10:
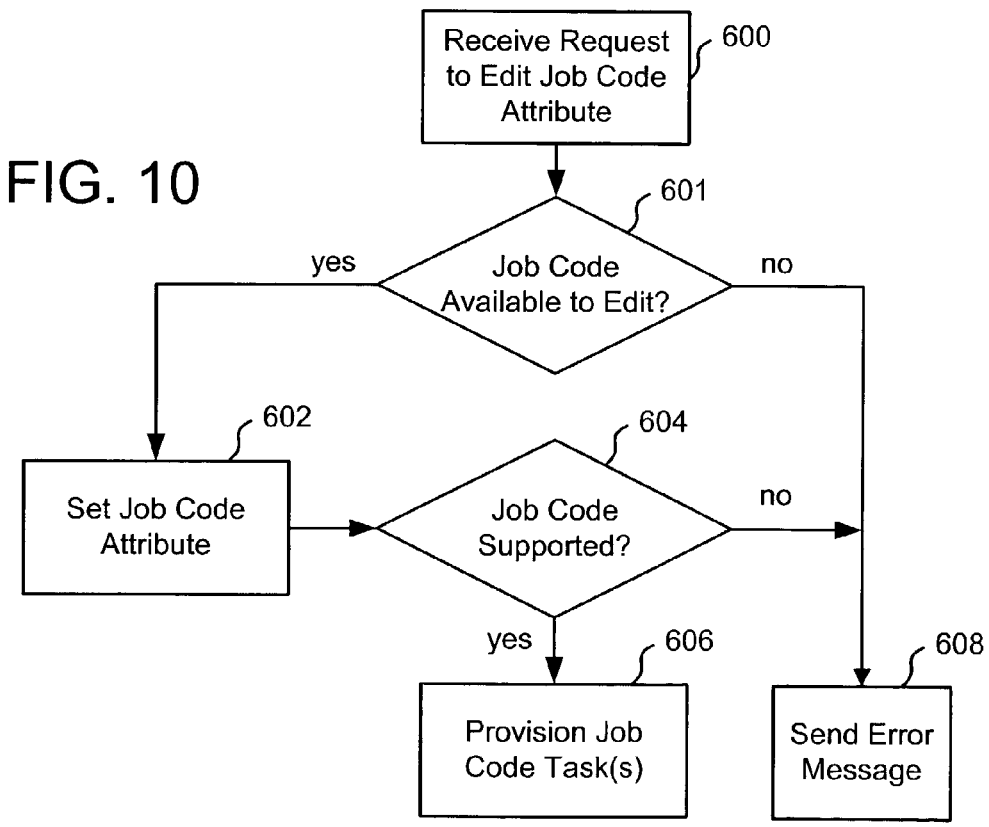
FIG. 10 is a flow chart describing one implementation of a process for setting a job code attribute and provisioning tasks in response to the job code attribute.

FIG. 10 shows a flow chart for one implementation of a process for setting a job code attribute and provisioning tasks in response to the job code attribute. In one version of an Identity System, the process shown in FIG. 10 is initiated by a workflow that creates or deletes an entity, such as a user. In further versions of the Identity System, the FIG. 10 process is performed when an entity, such as a user, is added to or removed from a group. In alternate Identity System implementations, the process shown in FIG. 10 can be initiated at different points in time. The steps shown in FIG. 10 may be implemented as parts of workflows, subflows, cross application workflows, or pre- or post-processing events in various embodiments. These concepts will be described in greater detail below. In one such embodiment, the steps shown in FIG. 10 are performed in multiple workflows, subflows, and/or cross application workflows.

At the outset of the process shown in FIG. 10, the Identity System receives a request to edit a job code attribute for an entity (step 600). Job code attribute edits supported by one implementation of the Identity System include adding a new job code to the job code attribute and removing an existing job code from the job code attribute. In alternate embodiments, different edits may be supported, such as changing a job code in the job code attribute.

The Identity System determines whether an entity's job code attribute is available for editing by the entity requesting the edit (step 601). For instance, a system administrator adding or removing a user from a group will most likely have authority to edit the user's job code attribute. A user, however, may not have authority to edit his or her job code attribute. In some embodiments of the process in FIG. 10, step 601 is omitted. If the entity requesting the edit lacks authority, the Identity System sends the requesting entity an error message (step 608). Otherwise, the Identity System sets the job code attribute in accordance with the requested edit (step 602).

In setting the job code attribute in response to the requested edit (step 602), the Identity System either adds a new job code, removes an existing job code, or performs a combination of job code additions and removals. As described above, some embodiments allow job code attributes to include multiple nested job codes. In these instances, a requested job code attribute edit may call for adding or removing multiple nested job codes.

After the job code attribute is set, Provisioning Bridge Server 49 determines whether the changes to the job code attribute are supported (step 604). Provisioning Bridge Server 49 determines whether provisioning systems in communication with the Identity System support the job codes being added or removed from the job code attribute. In one embodiment, Provisioning Bridge Server 49 accesses control information 500 to ensure that the job codes being added or removed are included in control information 500. Provisioning Bridge Server 49 verifies that a provisioning system in communication with the Identity System supports each resource Target and Type associated with the job codes being added to or removed from the job code attribute. In an alternate embodiment, the Identity System or another system performs step 604.

If the job code attribute edit is not supported, Provisioning Bridge Server 49 causes an error message to be sent (step 608). Otherwise, Provisioning Bridge Server 49 provisions the tasks associated with the job code attribute edit to the provisioning systems (step 606). In one implementation, the tasks being provisioned are those associated with adding or removing an entity's access to an external resource. For example, adding job code A from Table 2 to a job code attribute results in the need to provision three resource related tasks—1) creating an account on computer system 1 for performing legal applications, 2) creating an account on computer system 1 for performing engineering applications, and 3) creating an account on computer system 2 for performing e-mail applications. Removing job code B from Table 2 from a job code attribute results in the need to provision one task—eliminating an entity's account on computer system 3 for performing marketing applications.

Figure 11:
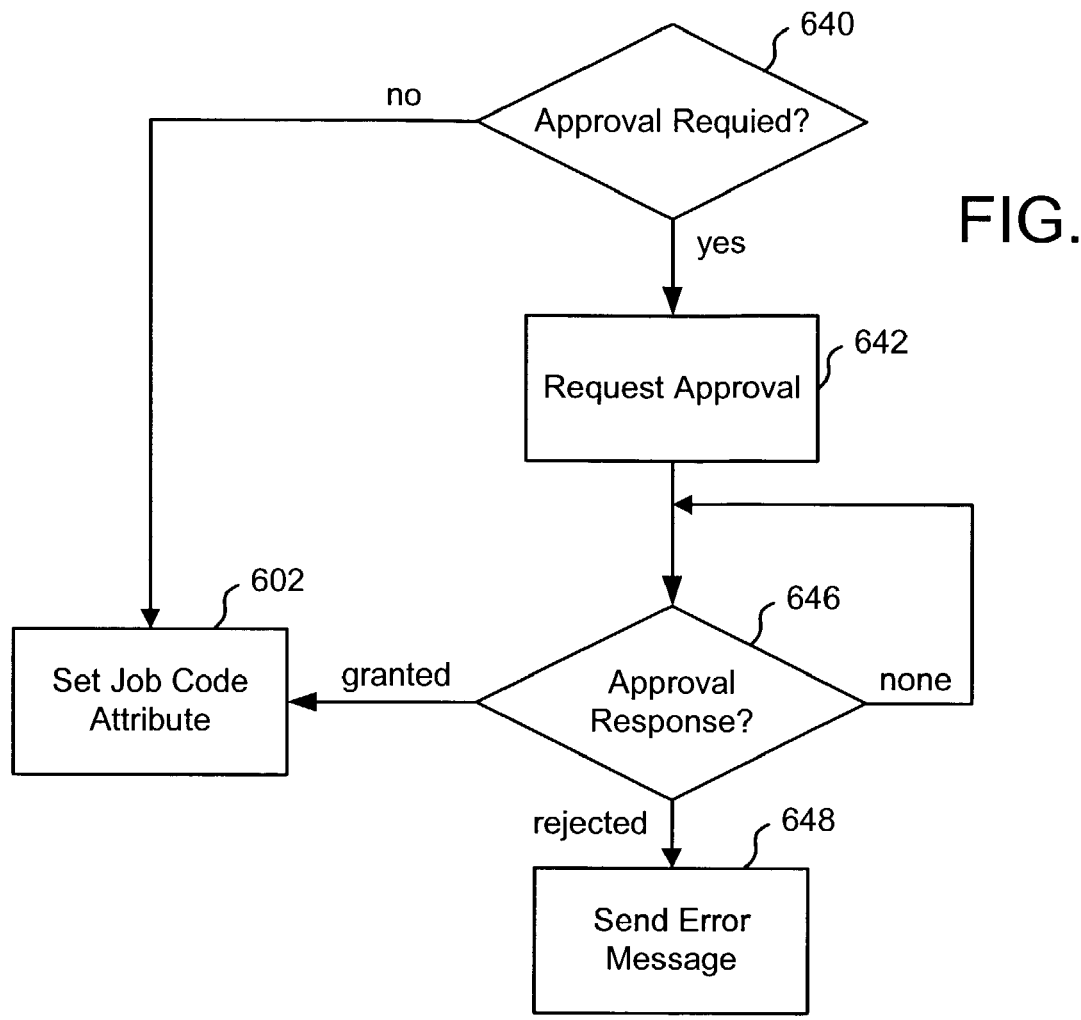
FIG. 11 is a flow chart describing a process for setting a job code attribute.

FIG. 11 is a flow chart describing one embodiment of a process for setting a job code attribute when approvals may be required for the requested setting. The process steps shown in FIG. 11 can replace process step 602 in FIG. 10 in one embodiment.

In the implementation shown in FIG. 11, the Identity System determines whether the requested edit to the job code attribute requires approval (step 640). An approval can be required for many different purposes. One example is an approval that the user requesting the edit has authority to make the specific edit requested. Criteria for determining whether to require approval can be set by a system administrator of the Identity System and retrieved by the Identity System in operation. If approval is not required, the Identity System sets the job code attribute in response to the requested edit (step 602). Otherwise, the Identity System requests approval (step 642). In one implementation, the Identity System requests an approval by sending an e-mail to an entity with authority to provide approval, such as a system administrator.

If approval is requested, the Identity System waits for a response (step 646). If approval is rejected, the Identity System sends an error message (step 648). If approval is granted, the Identity System sets the job code attribute in accordance with the requested job code attribute edit (step 644).

Figure 12:
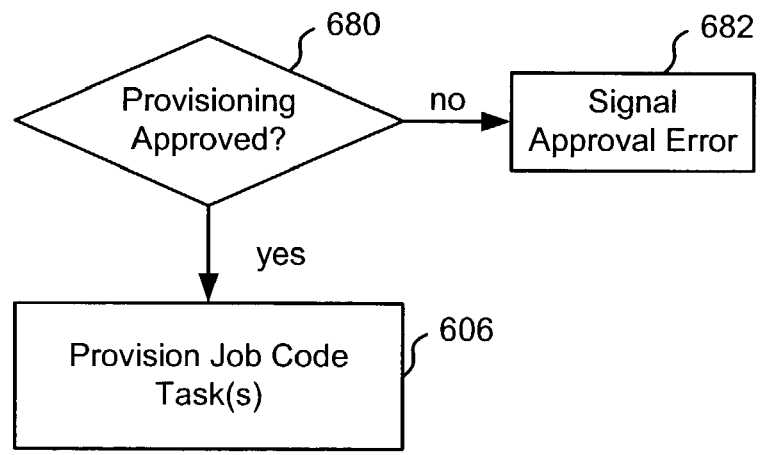
FIG. 12 is a flow chart describing a process for approving provisioning and provisioning job code tasks.

FIG. 12 is a flow chart describing a process for approving provisioning and provisioning job code tasks. The steps shown in FIG. 12 show a provisioning approval (step 680) being performed prior to the step of provisioning job code tasks (step 606). The steps in FIG. 12 are an alternative to only performing the step of provisioning job code tasks (step 606) as shown in FIG. 10.

In provisioning approval step 680, Provisioning Bridge Server 49 determines whether approvals are required for each of the tasks necessitated by the job code attribute edit. Provisioning Bridge Server 49 also attempts to obtain any required approvals. If approval is required and not provided, an approval error can be signaled. Otherwise, the job code related tasks can be provisioned (step 606).

Figure 13:
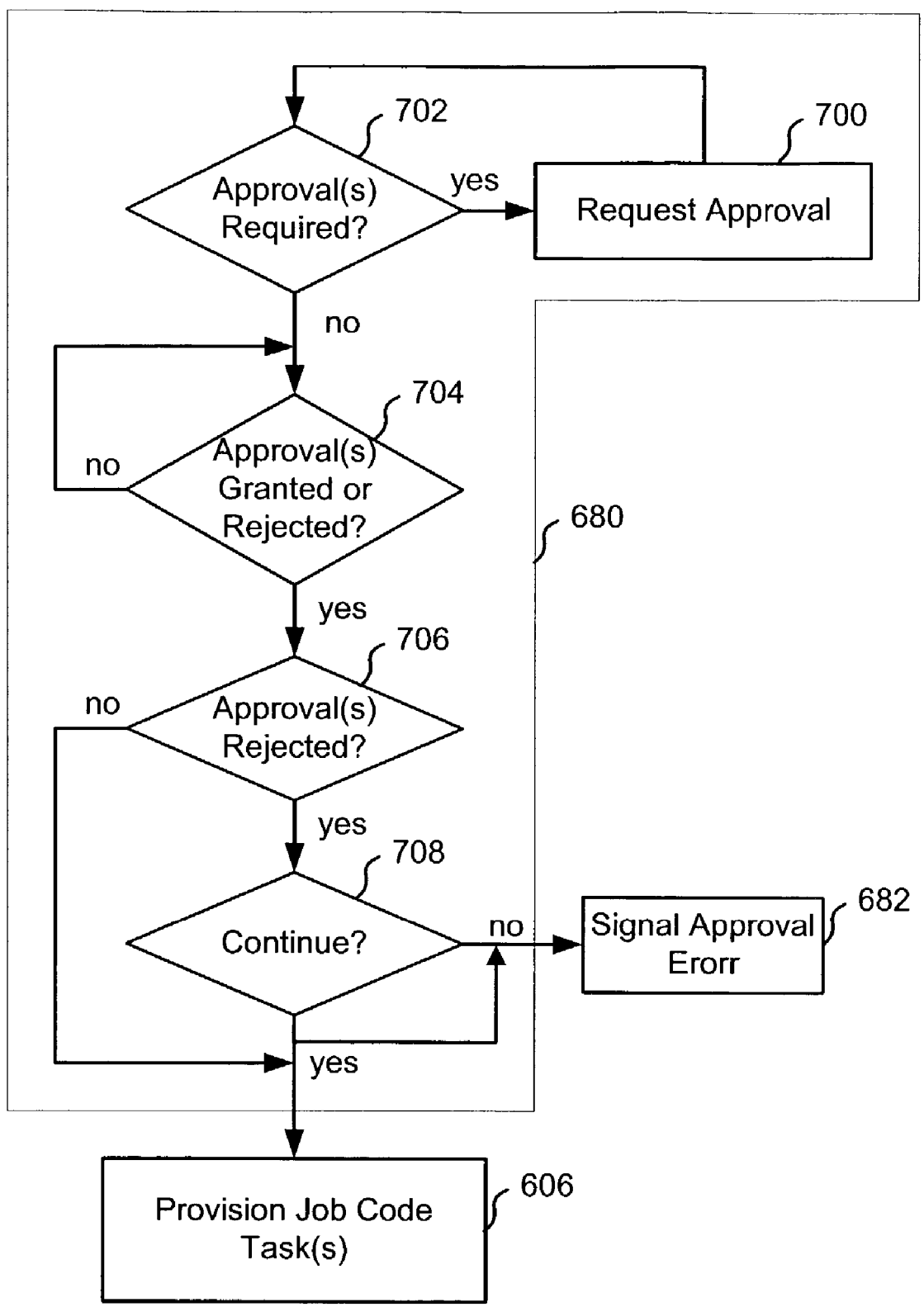
FIG. 13 is a flow chart describing a process for determining whether provisioning is approved.

FIG. 13 is a flow chart describing a process for determining whether provisioning is approved (step 680, FIG. 12). Provisioning Bridge Server 49 determines whether any approvals need to be obtained for job code related tasks and whether any required approvals have not yet been requested (step 702). Provisioning Bridge Server 49 queries control information 500 to identify the tasks requiring approval. As shown above, the entries in control information 500 identify when approval is required for the tasks of providing or eliminating access to a resource Target and Type for a job code.

If approval for a job code task is required and approval has not yet been requested, Provisioning Bridge Server 49 requests approval (step 700). As indicated above, one method of requesting approval is to send an e-mail to an entity authorized to provide approval. Provisioning Bridge Server 49 then determines whether any more approvals need to be requested (step 702).

When Provisioning Bridge Server 49 determines that all required approvals have been requested (step 702), Provisioning Bridge Server 49 waits for each approval request to be granted or rejected (step 704). After all of the approval requests have been either granted or rejected, Provisioning Bridge Server 49 determines whether any of the requested approvals were rejected (step 706). If none of the approvals were rejected, Provisioning Bridge Server 49 provisions the job code related tasks (step 606). Otherwise, Provisioning Bridge Server 49 determines whether to continue with provisioning in spite of the rejected approval (step 708). If Provisioning Bridge Server 49 is not to proceed with provisioning, an approval error is signaled (step 682). Otherwise, Provisioning Bridge Server 49 proceeds to provision the approved job code related tasks (step 606) and provides a signal identifying the approvals that were rejected (step 682).

The criteria for determining whether to continue in step 708 can be set by a system administrator when the Identity System is initialized. Alternatively, Provisioning Bridge Server 49 can send a message to a system administrator and wait for the reply to indicate whether to continue. Various other methods can be employed for making this determination.

In further embodiments, Provisioning Bridge Server 49 does not submit all of the approval requests and wait for their completion before proceeding. Instead, each approval request is assigned to a separate thread of operation and processed individually. In one implementation this processing occurs in parallel. In yet another implementation, this processing occurs serially.

Figure 14:
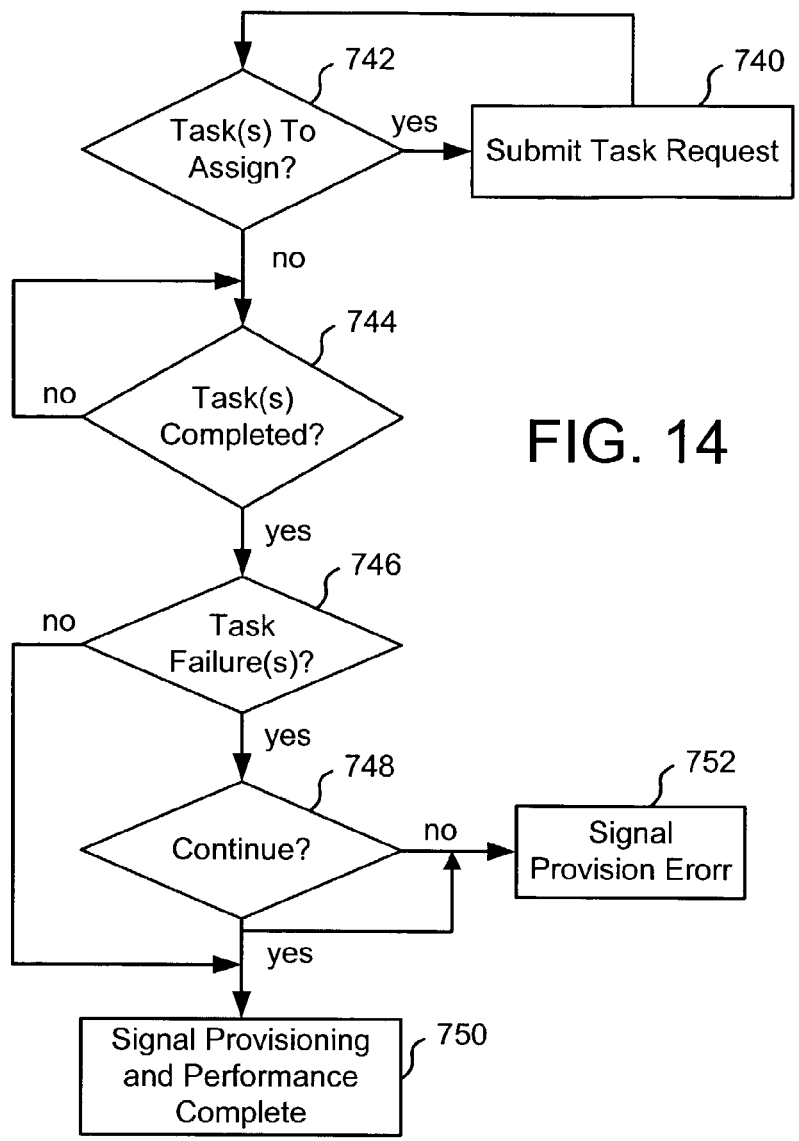
FIG. 14 is a flow chart describing a process for provisioning job code tasks.

FIG. 14 is a flow chart describing a process for provisioning job code tasks (step 606). Provisioning Bridge Server 49 determines whether any job code related tasks need to be assigned to a provisioning system (step 742). Provisioning Bridge Server 49 accesses control information 500 when determining the required tasks for a job code and the provisioning systems that perform those tasks. Control information 500 identifies the external resources, such as Target and Type, that need to be accessed for a job code and the provisioning system that supports each of the resources. If the job code is being added to the job code attribute, Provisioning Bridge Server 49 recognizes that the required tasks will call for providing access to the external resources specified for the job code. If the job code is being deleted from a job code attribute, Provisioning Bridge Server 49 recognizes that the required tasks will call for removing access to the external resources specified for the job code.

If there are tasks that have not yet been assigned to a provisioning system, Provisioning Bridge Server 49 submits a request to one of the provisioning systems (systems 510 and 520, FIG. 9) to perform a job code related task (step 740). Provisioning Bridge Server 49 submits the request to the provisioning system that is identified in control information 500 as corresponding to the external resources being affected by the job code task. After the task request is submitted, Provisioning Bridge Server 49 determines whether any job code related tasks still need to be assigned to a provisioning system (step 742).

Once all of the job code related tasks have been assigned, Provisioning Bridge Server 49 waits for the requested tasks to be completed (step 744), regardless of whether they have failed or completed successfully. In one implementation, each provisioning system signals when a task has been completed—indicating whether it completed the task successfully or failed. Provisioning Bridge Server 49 determines whether any of the tasks failed (step 746). If none of the tasks failed, Provisioning Bridge Server 49 signals that the job code related tasks have all been provisioned and successfully performed (step 750).

If any of the tasks failed (step 746), Provisioning Bridge Server 49 determines whether to continue with provisioning step 606 (FIGS. 10 and 12) or cancel all provisioning (step 748). If Provisioning Bridge Server 49 is not to proceed with provisioning, a provisioning error is signaled (step 752). In some embodiments, Provisioning Bridge Server 49 may also undo tasks that have already been completed. If provisioning is to continue, Provisioning Bridge Server 49 proceeds to signal that the successfully completed tasks have been provisioned and performed (step 750). In one implementation, Provisioning Bridge Server 49 also provides a signal identifying the failed tasks (step 752).

The criteria for determining whether to continue in step 748 can be set by a system administrator when the Identity System is initialized. Alternatively, Provisioning Bridge Server 49 can send a message to a system administrator and wait for the reply to indicate whether to continue. Various other methods can be employed for making this determination.

In further embodiments, Provisioning Bridge Server 49 does not submit all of the task requests and wait for their completion before proceeding. Instead, each task request is assigned to a separate thread of operation and proceeds individually. In one implementation this processing occurs in parallel. In yet another implementation, this processing occurs serially.

Figure 15:
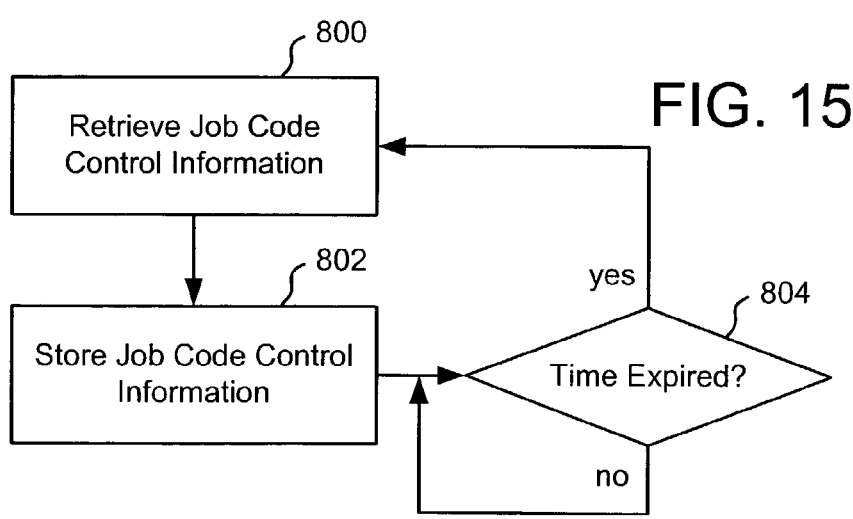
FIG. 15 is a flow chart describing a process for maintaining control information employed by the Provisioning Bridge Server.

FIG. 15 is a flow chart describing a process for maintaining control information 500. The process shown in FIG. 15 operates on an ongoing basis to periodically update control information 500. Job code related information for control information 500 is retrieved (step 800). In one implementation, Provisioning Bridge Server 49 queries provisioning systems, such as systems 510 and 520 (FIG. 9), to determine the external resources supported by each system. The Identity System also provides for retrieving information supplied by a system administrator that identifies approvals required for each job code and the resources, such as Targets and Types, associated with each job code. In further embodiments, additional information may be retrieved.

The retrieved information is stored in entries in control information 500 (step 802), as explained above and illustrated for one example in Table 2. After a predetermined period of time expires (step 804) the retrieval (step 800) and storage (step 802) operations are repeated. In one embodiment, the predetermined time period is twenty four hours—providing for daily updating of control information 500. In other embodiments, the time period may be larger or smaller. In further embodiments, system administrators are allowed to update control information 500 in real time on demand.

A lot of the tasks that are performed in the Identity System are accomplished using workflows. This includes the setting of job code attributes in one embodiment. A workflow is a predefined set of steps that perform a specific task, where information or tasks are passed between participants and programs according to a defined set of rules. One embodiment of the present invention supports the following types of workflows: create object; delete object; change the value of attributes; and certificate issuance, revocation and renewal. In one embodiment of the present invention, a user is required to create a workflow to create or delete an object, change the value of an attribute or implement certificates. Workflows ensure that an organization's guidelines for performing a task are met. Workflows can be defined in the User Manager, Group Manager or Organization Manager. A workflow can be used only in the application (e.g. User Manager) in which it was created. Each workflow has two or more steps, including one to start the action and one to implement or commit it. Each step can contain an action, send e-mail notifications to selected persons and start the next step if its entry conditions are satisfied. A workflow is associated with a portion of the directory tree. This allows an entity to have its organizations and partners enforce different workflows. Workflows can be stored in Directory Server 36.

Table 3 provides examples of different tasks that can be performed with workflows in the appropriate applications:

TABLE 3

| Application | Workflow Tasks |
| --- | --- |
| User Manager | Create User |
| | Delete User |
| | Change Attribute |
| | Certificate Enrollment |
| | Certificate Renewal |
| | Certificate Revocation |
| Group Manager | Create Group |
| | Delete Group |
| | Change Attribute |
| Org. Manager | Create Object |
| | Delete Object |
| | Change Attribute |

Each workflow includes two or more steps. Each step can include one or more actions. Table 4, below, provides examples of different actions that can be performed with various types of workflows:

TABLE 4

| Workflow Type | Actions |
| --- | --- |
| Creating object | Initiate |
| | Self Registration |
| | Provide Information |
| | Approval |
| | Provide Information and Approval |
| | Activate |
| | Commit |
| | Error Report |
| | External Action |
| Deleting object | Initiate |
| | Change Information |
| | Approval |
| | Change Approval |
| | Deactivate |
| | Commit |
| | Error Report |
| | External Action |
| Changing Attribute | Request |
| | Approval |
| | Provide Information |
| | Provide Information and Approval |
| | Commit |
| | Error Report |
| | External Action |

Table 5 provides a description of the various actions:

TABLE 5

| Action | Description |
| --- | --- |
| initiate | This action initiates workflows. Required, option, and supplied attributes may be configured for this action. Based on the relevant data configured in the step, the action will compose a page for the user to fill in the required information and to add additional attributes for provisioning (supplied variables) if so desired. Once the page is submitted, the workflow engine will trigger the Change Attribute workflows for the supplied attributes. People who are configured as a participant for this action and its corresponding workflow will see the "Create Profile" or "Initiate Deactivate User" button. |
| self_registration | This action allows an e-user to fill in a registration form and submit it for acceptance. The required information will be displayed on the page. It is envisioned that self-registration will be used before the user has access to an application. Therefore, the UI of this page will be designed without the context of an application and with credentials for authentication. |
| request | This action makes a request for change/add/delete attribute. People who are configured as a participant for this action and its corresponding workflow will see the "Request to Modify" or "Request to Remove" button on the profile page (during "modify" mode). |
| provide_info | This action is similar to initiate, in that it collects information from the user and triggers other workflows, if necessary. It is treated as a different action from initiate for the following reasons:<br>    Initiate is always the first action in the workflow.<br>    Provide_info can occur at multiple places in a workflow while initiate can not.<br>    The people who can initiate the workflow may be different from those who can provide intermediate information.<br>    Only the people configured as the participants for the initiate action will see the "Create Profile" button.<br>    Provide_info will try to retrieve the required attributes to display the values to the user. This allows the information setup in the previous steps or in the directory to be changed. |
| change_info | This action is identical in behavior to provide_info. A different name is used because the name change_info makes more sense in the case of deactivating. |
| approval | This action can be configured with only the required attributes. At run time, the values of the required attributes will be presented to the user to get approval. No information is supposed to be changed. The only user action allowed is to click on the button to indicate approve or reject. In other embodiments, a digital |

TABLE 5-continued

| Action | Description |
| --- | --- |
| | signature could be used to provide a nonrepudiation approval. |
| Provide_info and approval | This action combines the provide_info and the approval into one action. In some situation, customers may want the people who can approve also to be able to provide or change the information if necessary. |
| change_approval | This action is identical in behavior to provide approval. A different name is given to reflect the nature of the action in the deactivating context. |
| activate | This action enables the user to explicitly mark an entry ready. Until this action is performed, the user's entry has been marked as "PendingActivation." Upon completing this action, the status will be changed to "Activated." Once "Activated," this user entry may be used for authentication to the system. |
| deactivate | This action is the counterpart of the activate action to mark an entry suspended. Until this action is performed, the user's entry has been marked as "Pending for Deactivation." Upon completing this action, the status will be changed to "Deactivated." In both of these cases, this entry will not be recognized as an authorized user in the system. |
| commit | This action writes the information collected this far in the previous workflow steps to the directory. Commit can be done multiple times. The location of the write is the user's permanent location as selected in the "initiate" step. |
| error_report | This action is to report for a background process. When a background process encounters a processing error, it has no proper way to report the error since there is no responsible person for the action. The workflow definer can configure the failed path to this error_report step, so that the error can be designated to the responsible individuals. |
| external_action | External action can be plugged into the workflow as a distinct step. |

A subflow is a workflow that is initiated by another workflow. The concept of subflow was introduced and implemented to reduce administrative work. If a workflow already exists to perform a task, any other workflow that needs to perform that task should be able to leverage off the first workflow. When creating a workflow, an indication that there is a sub-workflow is provided by the creator of the workflow when the creator indicates that one or more of the variables are supplied.

The workflow that initiates the subflow is referred to as the parent workflow. A workflow can be both a parent workflow to a first workflow and a subflow to a second workflow. The parent workflow may or may not wait for the subflow, as defined in the workflow creation. Consider the following example, a company uses a first workflow to create new users for the Identity System and add the new user's identity profile to the directory. As part of its process, the new user workflow obtains the new user's telephone number. The obtaining of the new user's telephone number is accomplished by performing a new telephone number workflow. In this example, the new telephone number work-flow is initiated by a step in the new user workflow. Therefore, the new telephone number workflow is a subflow of the new user workflow. In one alternative, the new telephone number workflow can also call a subflow, for example, to get a new telephone line connected and operational. This, second subflow can also call a subflow, and so on. There can be many levels of nesting of subflows. Another example of a subflow is a workflow for setting a job code attribute. In one embodiment, the job code attribute subflow may call other subflows for determining whether the job code attribute is supported and provisioning job code related tasks. Additionally, a parent workflow can have many subflows.

In one embodiment, a parent workflow and its subflows must all be performed by the same application. For example, they all must be performed by the User Manager. Or, they must be performed by the Group Manager, etc.

FIG. 16 is a flowchart describing the process of using a workflow. The process of FIG. 16 is performed, for example, when creating a new user, a new group, etc. In step 840, the relevant manager (e.g. user, group or organization) receives a request to perform an action that requires a workflow. Most actions are likely to have an effect on at least one identity profile in the directory. In step 842, it is determined whether this user is allowed to initiate the workflow. If not, the process of FIG. 16 is completed. If so, the GUI determines and reports a set of one or more workflows. This set of one or more workflows meets three criteria: (1) the user is allowed to use the workflows, (2) the workflows perform the requested task and (3) the workflows are associated with a domain that includes the target of the task. For example, if user A has requested to modify the attributes of Employee 8 (identity profile 264 of FIG. 3), then the system will identify and report workflows that (1) user A has permission to access, (2) perform attribute modification and (3) are associated with a domain that includes identity profile 264 of FIG. 3. In one embodiment, the identified workflows are displayed in a menu.

In some situations, a workflow is requested without knowing the location of the target identity profile. For example, a user can request to create an object without indicating where to store the object in the directory. In such a scenario, the system will find and report workflows that perform the requested task and can be accessed by the user. When the system reports the list of workflows (e.g. via a GUI), the system will also report the domain associated with each workflow. In this situation, step 846 includes the system receiving a selection from the user of the workflow desired, and the domain to operate on.

In step 846, the system receives a selection from the user of the workflow desired. Note that is step 844 only identified one workflow, then step 846 can be skipped or performed automatically. In step 850, it is determined whether the user is allowed to perform this workflow step. If not, the process of FIG. 16 is completed, at least temporarily. One embodiment of the process of FIG. 16 does not include step 850. If the user is allowed to perform the step, then the event catalog is accessed in step 852. The event catalog, which will be discussed in more detail below, is a list of events that trigger actions (e.g. cross application workflows) external to the workflow. In one embodiment, the event catalog is only checked if the template allowed for the use of external actions. For example, one of the actions allowed in a workflow step and defined in a template is "external_action."

In step 854, pre-notifications, if any, defined in the workflow are sent out. In step 856, cross application workflows, if any, are invoked, as per the event catalog. In step 858, the current step of the workflow is performed. In step 860, it is determined whether there are supplied variables. When creating a workflow, the creator had the option of defining the types of variables. Supplied variables are those variables whose value will be supplied by a subflow. If the current step has a supplied variables, then the system searches for any workflows that can supply the variable and apply to the appropriate domain. If only one workflow is found for each supplied variable, then those workflows are initiated as a subflow in step 862. If multiple workflows are found for a particular supplied variable, then the user is given a choice and the chosen workflow is initiated as a subflow in step 862. Note that the subflow could itself have a subflow, which could itself have a subflow, and so on. There is no limitation on the number of subflow nestings.

If there are no supplied variables, or after the subflow(s) are started, the event catalog is accessed in step 864. Note that cross application workflows can be started pre-step or post-step. Step 864 is for post-step cross application workflows. In step 866, post step notifications are sent out, if any. In step 868, the next step is accessed from the workflow definition. If there are no more steps, then the process of FIG. 16 is completed. In step 870, the event catalog is checked. In step 872, pre-notifications are sent out.

In step 874, the system determines whether the user is allowed to perform the next step. If not, the process of FIG. 16 is stopped. If so, the system determines in step 876 whether it has to wait for the subflow(s) started in the previous workflow step. In one embodiment, a flag is set at workflow creation time to indicate that the workflow should wait or not wait. If there is a subflow and the current workflow has to wait, the system continues to wait until the subflow is completed. If there is no subflow or it does not have to wait, then the system determines whether all entry conditions have been satisfied in step 878. If not, the system waits for the entry conditions to be satisfied. If yes, the process continues to step 858.

Note that different steps may be set up for performance by different users. Thus, a first user may start the workflow but a different user or a different set of users may be needed for intermediate steps. Therefore, the process of FIG. 16 performed by the initial user may temporarily halt. As described above, if another user is needed to perform a step, that user will be notified either by e-mail or through one of the request tabs discussed above. When that user desires to perform the step, the user will request access to the workflow in step 884 of FIG. 16. For example, the user can respond to a link in an e-mail or select a workflow listed in one of the request tabs. In step 886, the step for that particular user is accessed, and then the method continues with step 874 of FIG. 16.

Figure 17:
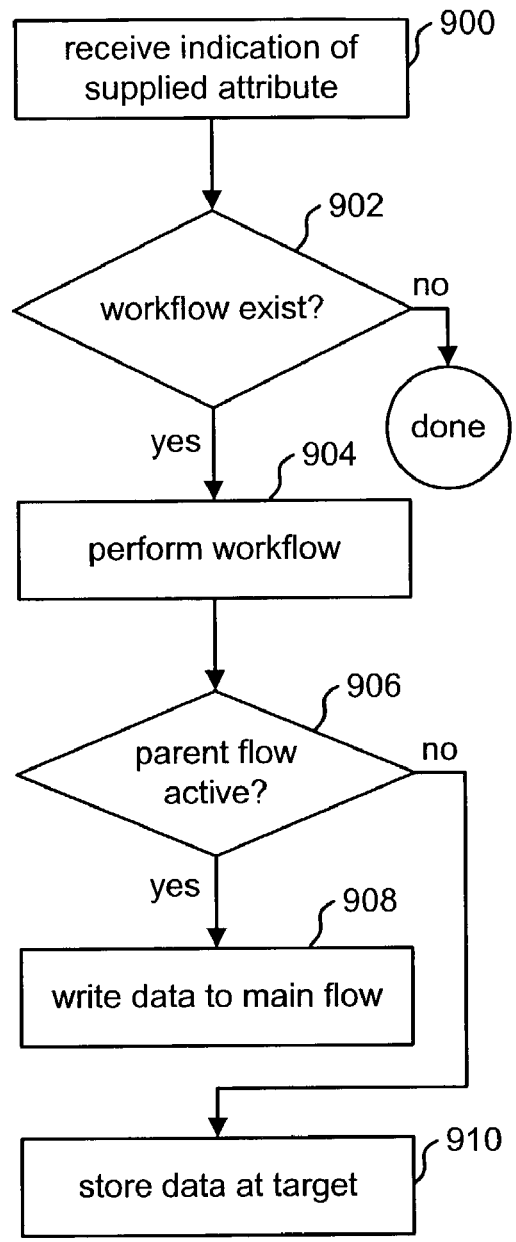
FIG. 17 is a flow chart describing one embodiment of a process for using a subflow.

FIG. 17 is a flowchart describing the process for using a subflow. In step 900, the workflow engine (part of Identity Server 40) receives an indication that a variable/attribute is to be supplied. In step 902, the engine determines whether a workflow exists for that particular variable that applies to the user and domain. If not, the process is done and the supplied variable is not supplied. If there is a workflow available, then that workflow is performed in step 904. When the workflow is completed, it is determined whether the main workflow (parent workflow) is still active. The parent workflow may still be active because it is waiting for the subflow to complete. Alternatively, if the parent workflow is not waiting for the subflow to complete, then the parent workflow may not necessarily be active. The parent workflow may be completed.

If the parent workflow is still active, then the result of the subflow is written to the parent workflow in step 908. If the parent workflow is not active, then the result is written to the target identity profile in step 910. In an alternative embodiment, the end result of the subflow can be written to the target identity profile regardless of whether the parent workflow is still active or not. Note that a subflow may have a subflow of its own, which would cause the process of FIG. 17 to operate in a recursive manner. There is no limit on the number of subflow nestings.

A workflow is performed by one of the three managers described above (User Manager, Group Manager, Organization Manager). There may be cases when one workflow in one of the applications (e.g. user manger) needs to trigger a workflow in another application (e.g. Group Manager). For example, when creating a new user with a workflow in the User Manager, it may be beneficial for that workflow to trigger another workflow in the Group Manager which subscribes the new user to groups. A cross application workflow is performed using the event catalog described above, a client program and (optionally) a configuration file for the client program, all of which will be described below.

The cross application workflow uses a pre and post processing feature of the integrated Identity System and Access System. The pre and post processing allows third parties to extend the base of functionality of the system by providing custom actions based on specific defined events. The base elements of pre and post processing are called events. Events occur any time the user interacts with the system. Events can be as simple as adding, modifying or deleting an object or could be as complex as a specific step within a workflow process.

Actions are functions or applications that perform a task in response to an event. These actions are defined to enhance the base functionality of the system of FIG. 1. Multiple actions can be defined for each event. Actions are executed in the order that they appear in an event catalog. Actions are defined using a plug-in model similar to Web Server CGI model. Functions are applications defined for each custom action. Each function/application will take a standard XML structure as its parameters that allow the system to specify information about the event that triggered the function. Action functions are defined within libraries (.dll or .so) or stand alone executable files. To create a new action based on an event, one must insert a hook into the event catalog. All entries in the event catalog are defined in the following format:

actionName; exectype; param1, param2, . . . ; path; execparam; func;

The "actionName" is the name of the event. The convention for most events is APPNAME_EVENTNAME_PPP-TYPE, where APPNAME is the name of the application, EVENTNAME is the name of the event and PPPTYPE is the type of processing (pre event or post event). For a workflow, the APPNAME is the workflow ID for the workflow, the EVENTNAME is the step number in the workflow. The "exectype" is a type of hook, which can be exec or lib. An exec is an executable. A type that is lib is in a library such as a dll. The "param" is the parameter, which the system takes to output the value. The parameters are deliminated by commas. The "path" is the path for the external exc or dll to be launched. The "execparam" identifies the input parameters, deliminated by a comma. The "func" is the function in the shared library. Thus, when the event defined in actionName occurs, the appropriate executable or library function is called.

The function in the shared library or the executable that is to be executed upon the event (hereinafter referred to as the "client program") needs to include logic to decide which workflow (or other process) to be invoked. It can make use of a configuration file to have a mapping between workflows and any distinguished names, values of attributes, system parameters and any other variables of interest. This client program, after deciding which workflow to call, must connect to the system. In some embodiments, the client program does not call any workflows rather the client program does all of the work or the client program calls another program/function.

In one embodiment, the integrated Access and Identity System accepts XML document inputs that are encapsulated in a SOAP envelope using HTTP protocol requests. The XML document contains the necessary parameters and authentication information for carrying out the request. The request is sent to an appropriate URL for the desired application. The Identity System provides the desired application's response to the client program as an output XML document.

The XML input language is a language based on SOAP that allows customers to perform functions outside of the current GUI. The structure of SOAP requests is explained in greater detail below.

One example of a use for a cross application workflow is for a new user workflow to spawn a subscribe to group workflow. The following is the XML input to spawn the subscribe to group workflow:

```
© Oblix, Inc., 2001
<?xml version="1.0"?>
  <oblix:requests>
    <authentication type="basic" login="newuser"
password="passwd">
    <oblix:request application="groupservcenter"
function="SetGroupSubscription" includeRequest="none"
displayOutput="No">
      <oblix:params>
        <oblix:param name="useruid">
          <oblix:value>cn=new user,
ou=engineering,o=company,c=us</oblix:value>
        </oblix:param>
        <oblix:param name="groupuid">
          <oblix:value>cn=engineering group,
ou=engineering,o=company,c=us</oblix:value>
        </oblix:param>
      </oblix:params>
    </oblix:request>
  </oblix:requests>
```

Figure 18:
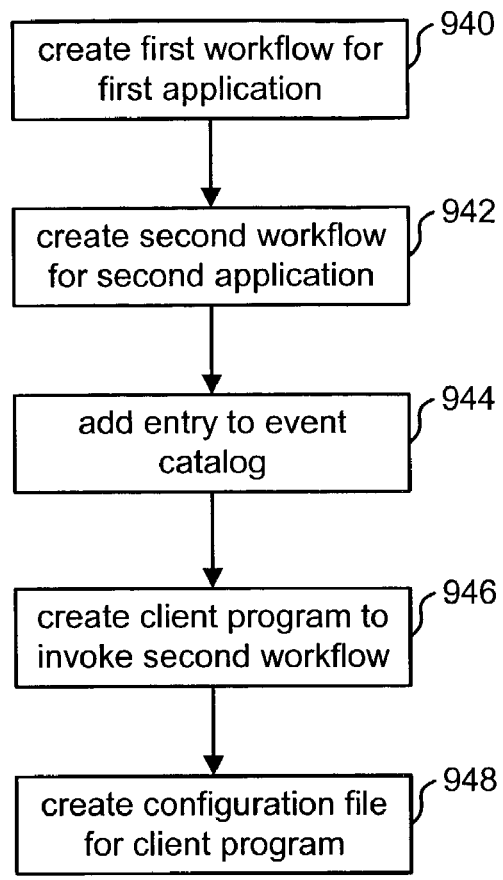
FIG. 18 is a flow chart describing one embodiment of a process for creating a cross application workflow.

FIG. 18 is a flowchart describing the process for creating a cross application workflow situation. In step 940, the first workflow for the first application is created. For example, the create user workflow for the User Manager application is created. In step 942, the second workflow for the second application is created. For example, the subscribe user to group workflow can be created in the Group Manager application. In step 944, an entry is added to the event catalog. For example, an entry is added to the event catalog that indicates the workflow ID for the workflow created in step 940—the step that should spawn the second workflow and that it is a post event. The entry also identifies the client program that will be created (see below). In step 946, the client program is created which invokes the second workflow. This client program receives the distinguished name of the newly created user as a parameter. In another embodiment, the client program receives other attributes from the identity profile being operated in by original workflow. The client also receives the workflow instance, the work step identification, and attributes of the work step. In step 948, a configuration file may be created for the client program. For example, if the second workflow is to subscribe a user to a group, then the configuration file may include rules for which users should be added to which groups.

Figure 19:
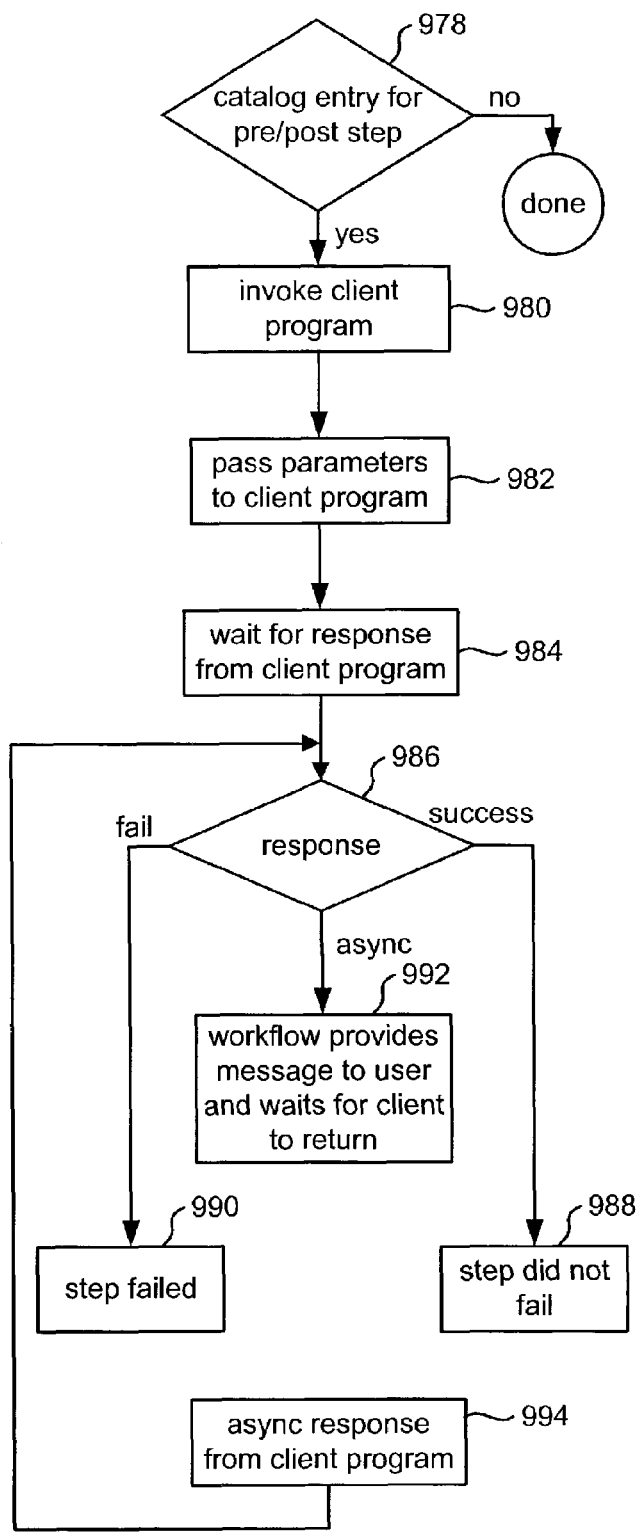
FIG. 19 is a flow chart describing one embodiment of a process performed to implement a cross application workflow.

FIG. 19 is a flowchart describing the process of accessing the event catalog in order to invoke cross application workflows. The process of FIG. 19 is performed by a workflow engine in one of the applications during steps 852, 864 and 870 of FIG. 16. In step 978 of FIG. 19, the workflow engine determines whether there is an entry in the event catalog for the current step of the workflow. If step 856 is being performed, the workflow engine is looking for a catalog entry that is a pre-event. If step 860 is being performed, the workflow engine is looking for a catalog entry that is a post-event. If no catalog entries exist, then the process of FIG. 19 is done. If a catalog entry exists, then the client program identified in the catalog entry is invoked in step 980. In step 982, the parameters are passed to the client program. In step 984, the workflow engine waits for a response from the client program. The client program will respond with one of three status codes: success, fail, or async. If the return code is "success" then the cross application workflow did not cause the step to fail (step 998). If the response from the client program was "fail" then the workflow engine considers the step to have failed (step 990).

When the client program is called, it is passed the following information: distinguished name of the user, attributes that have been preconfigured in the event catalog, a callback handle URL and the workflow ID. The callback handle URL is a URL for the client program to call back the workflow if the workflow returns a "async" status code. The client program is written to return either failure, success or async depending on the conditions specific to that particular program. When the client program returns with "fail" or "success" the workflow continues. If the client program returns "async," then the first workflow pauses until the client program invokes the callback handle URL to start the first workflow again. When the client program sends an "async" status, the user at the browser receives a status message that the workflow is pending for another event.

Therefore, in step 986, if the response is "async" then the workflow engine pauses and waits for the client to return in step 992. The user is provided with a message that the workflow is paused. When the client program invokes the callback URL (step 994), the workflow engine will receive an asynchronous response of either a "success" or "fail" with the callback URL. If the result is "fail" (step 986), then the process continues at step 990. If the result is "success" (step 986), then the process continues at step 988.

Figure 20:
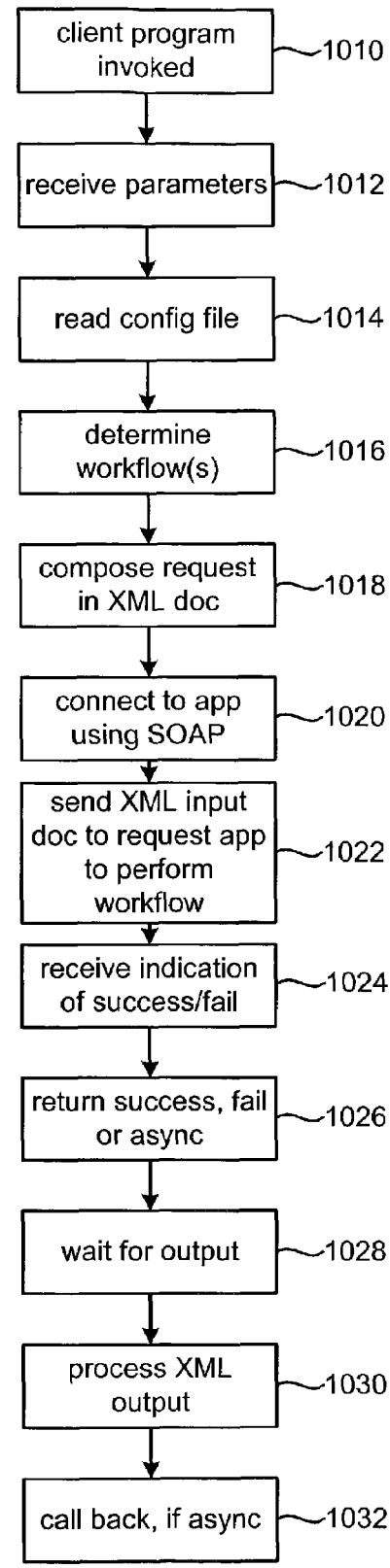
FIG. 20 is a flow chart describing one embodiment of a process performed by a workflow client program to implement a cross application workflow.

FIG. 20 is a flowchart describing a process performed by the client program during the cross application workflow process. In step 1010, the client program is invoked. In one instance, the client program is invoked in response to an event being recognized in the event catalog. For example, step 1010 can be performed in response to step 980 of FIG. 19. In step 1012, the client program receives the data discussed above (see step 982 of FIG. 19). In step 1014, the client program reads the configuration file. Note that some client programs may not need a configuration file. In step 1016, the logic in the client program determines which workflow in which application to invoke. In step 1018, the client program composes a request in an XML document, as described above. In step 1020, the client program connects to the appropriate application using SOAP. In step 1022, the XML input document is sent to the relevant application. In response to the XML input document, the application will perform the requested workflow or other service. In step 1024, the application responds, and the client receives an indication of whether the second workflow was started successfully.

In step 1026, the client program returns a status message back to the workflow engine indicating success, failure or async, based on whether the second workflow started successfully and other custom logic (optional). In step 1028, the client program waits for the output message from the application running the second workflow. The output message is likely to be sent to the client program after the second workflow is completed. The output message is an XML document. In step 1030, the output message is processed (including being read and acted on). In step 1032, the client program invokes the callback URL if the previous status was "async." Note that the above discussion was tailored to cross application workflows. However, the pre and post processing features, including the event catalog, client program and XML inputs, can be used to associate with events other than workflow events and other than workflow actions.

Group manager 44 also allows an administrator to associate a policy with a group that controls user subscription to and unsubscription from that group. Subscription is defined as adding the user to the static membership of the group. Unsubscription means removing the user from the static membership of the group. A static member is a member who is explicitly identified as a member, as opposed to a dynamic member that is indirectly identified by a rule or other means. In one embodiment, an identity profile for a group includes an attribute that stores a list of all static members and an attribute that stores—an identification of the policy for subscribing/unsubscribing.

While viewing the attributes of a group, a user can request to subscribe or unsubscribe. In one embodiment, a "subscribe" button or "unsubscribe" will be displayed in the GUI while the user views the attributes of a group. By selecting the button, the subscribe or unsubscribe process will start based on the policy for that group. The process of subscribing or unsubscribing according to a policy is typically initiated by the user who is being added to or removed from the group. However, in other embodiments, a first user can request that a different user be added to or removed from the group.

There are at least four policies for subscribing/unsubscribing: open, open with filter, control through workflow and closed. An open policy does not restrict subscription or unsubscription, any user can subscribe or unsubscribe. The open with filter policy requires that a user satisfy an LDAP rule (or other type of rule) to subscribe but does not require that the rule be satisfied to unsubscribe. The control through workflow policy requires a user to subscribe or unsubscribe through a workflow process. In one embodiment, in order to start the process, the user must be a participant in the first step of a workflow that changes the static member attribute of the group. A closed policy prohibits the subscription to or unsubscription from the group. The open and open with filter policies are less restrictive than the control through workflow and close policies. In one embodiment, the system enforces the rule that no group with a less restrictive policy can be added as a nested member to a group with a more restrictive policy. This rule avoids subversion of the latter policy.

Figure 21:
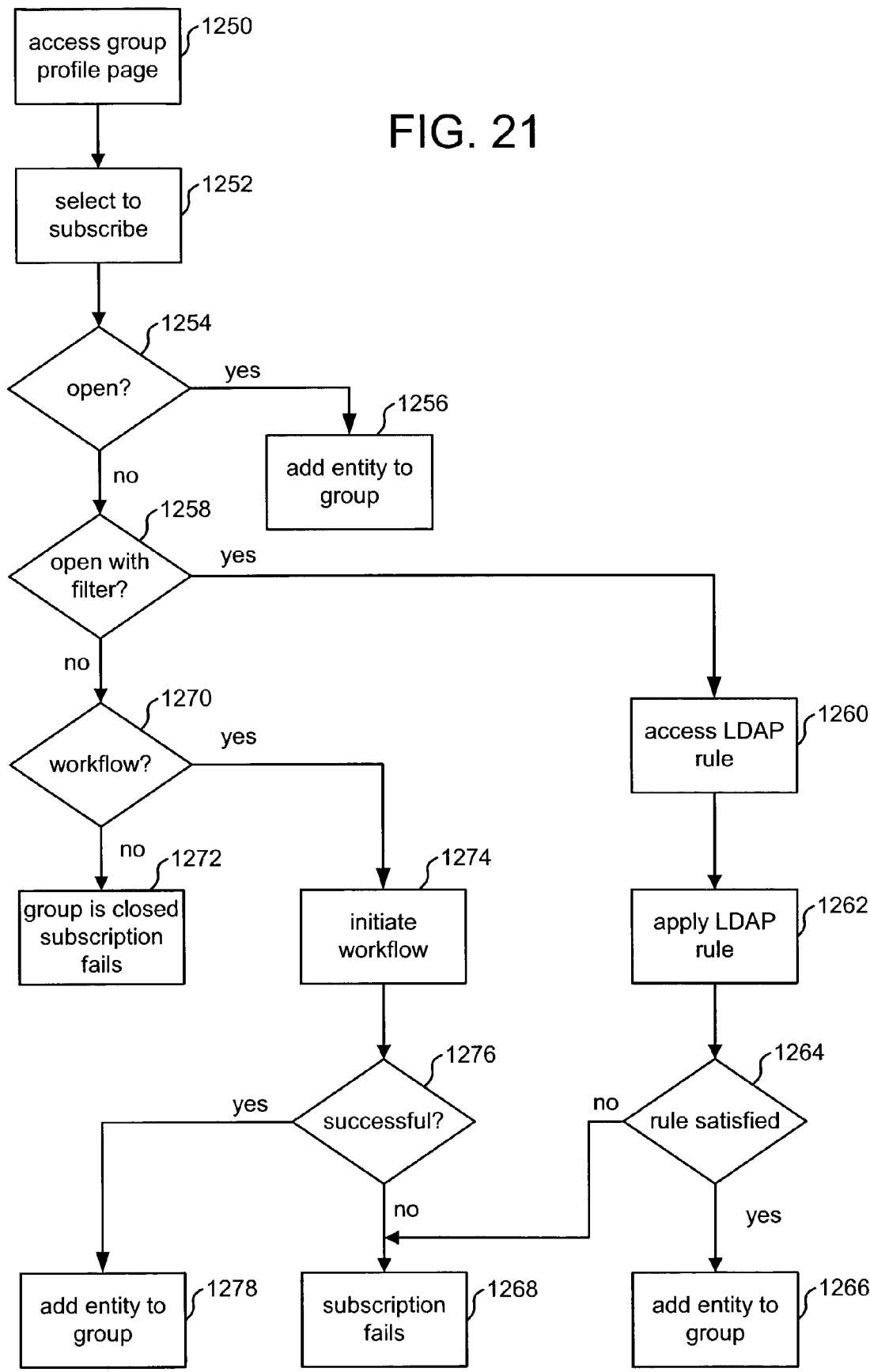
FIG. 21 is a flow chart describing one embodiment of a process for subscribing to a group.

FIG. 21 is a flowchart describing the process for subscribing to a group. While interacting with Group Manager 44, a user can use search tool 432 or other means to identify a list of groups. By selecting one of those groups, the user can access the profile page for that group (step 1250). A profile page may have a "subscribe" button. A user chooses the "subscribe" button in step 1252, indicating that the user wishes to subscribe to that group. In response to the user (or other entity) selecting the "subscribe" button, Group Manager 44 accesses the group's attribute that stores the identification of the policy for subscribing/unsubscribing and determines whether the subscription policy of the group is "open" (in step 1254). If the policy is "open," then that entity is added to the group in step 1256. If the policy is not open, then the system determines whether the policy is "open with filter" (in step 1258). If so, the system accesses the LDAP rule associated with the policy in step 1260 and applies the LDAP rule to the user's identity profile in step 1262. If the LDAP rule is satisfied (step 1264) then the entity is added to the group in step 1266. If the rule is not satisfied, then the user is not added to the group and the subscription fails in step 1268.

If the subscription policy was not open or open with filter, the system determines whether the subscription from policy is "controlled through workflow" (step 1270). If so, then the workflow is initiated in step 1274. If the workflow completes successfully (step 1276), then the entity is added to the group in step 1278; otherwise, the subscription fails and the entity is not added to the group in step 1268. In one embodiment, the workflow is used to approve a user for a group. If the user is approved, the user is added to the group after the workflow completes. In another embodiment, the user is approved and added to the group by the workflow. If the subscription policy is not "open," "open with filter," or "controlled through workflow," then the group is closed and the user cannot be added to the group (step 1272).

Figures 22, 23:
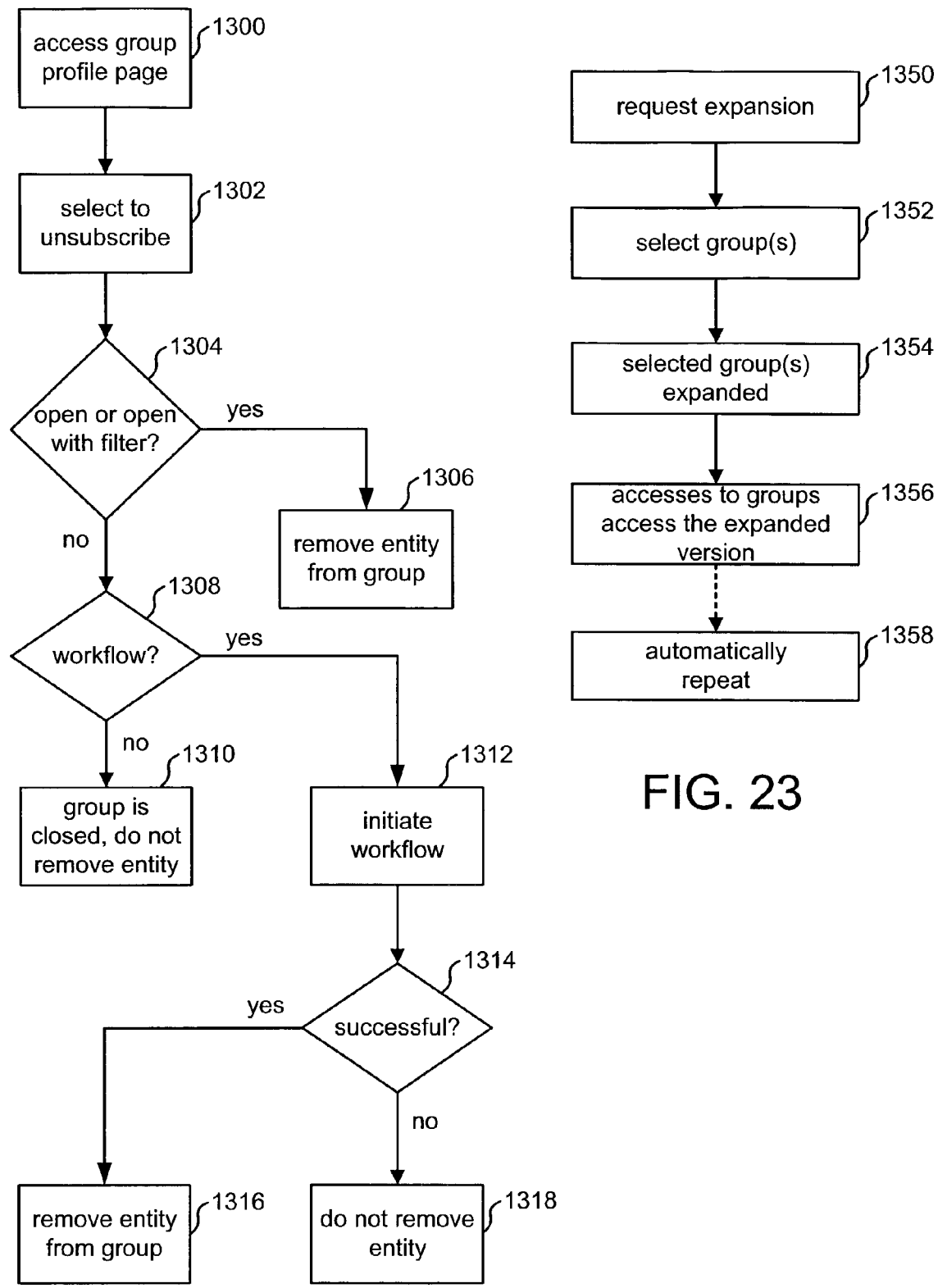
FIG. 22 is a flow chart describing one embodiment of a process for unsubscribing from a group.
FIG. 23 is a flow chart describing one embodiment of a process for expanding a group.

FIG. 22 is a flowchart describing the process for unsubscribing from a group. In step 1300, the entity accesses a group profile page. This group profile page may include an "unsubscribe" button. The user selects that button to unsubscribe from the group in step 1302. The user profile page may be accessed in many ways including using a search tool or from a list of groups when the user selects My Groups tab 434. After the user selects to be unsubscribed from the group, the system determines whether the subscription policy is "open" or "open with filter" (step 1304). If so, the entity is removed from the group in step 1306. If not, the system determines whether the policy is "controlled through workflow" (step 1308). If not then the group is closed and the entity cannot be removed (step 1310). If it is "controlled through workflow," then the workflow is initiated to step 1312. If the workflow completes successfully (step 1314), then the entity is removed from the group in step 1316. If the workflow does not complete successfully, then the entity is not removed from the group (step 1318). In one embodiment, the user is approved for removal by the workflows, and actually removed from the group after the workflow completes. In another embodiment, the user is both approved and removed from the group by the workflows.

Another feature of Group Manager 44 is the ability to perform group expansion. Expanding a group means evaluating the LDAP rule that specifies its dynamic membership and then updating the static membership list with results of the evaluation of the LDAP rules. Expansion, in effect, populates the static membership with a snapshot of the dynamic membership at the time of expansion. Expansion has performance implications. On one hand, it is much faster to evaluate group membership by looking up a value in the static membership list than to evaluate the rule that specifies dynamic membership. On the other hand, frequently updating groups is, in itself, computationally expensive. If the expansion occurs as a separate process, the performance hit can be hidden from the user. An administrator should expand the groups regularly to maintain accuracy. It may be possible to create a background process that automatically expands a group at certain intervals.

In one embodiment, the group expansion feature can be accessed from Configure tab 440 in Group Manager 44. Within the configure tab there is a button labeled "Expand Dynamic Groups." FIG. 23 is a flowchart for describing the process for expanding dynamic groups. When the user selects the button in Configure tab 440, a request to expand is sent to Group Manager 44 in step 1350. The administrator can select a particular group or set of groups to be expanded in step 1352. In step 1354, these groups are expanded by determining all of the members of the groups. In one embodiment, the process of expanding the groups only determines dynamic members. In another embodiment, the process of expanding determines dynamic members and nested members (including multiple levels of nesting). Step 1354 also includes storing all of the determined members. In one embodiment, the system will store and keep track of which group members were added during expansion and which members were original static members. That is because future expansions may remove some members that no longer satisfy the LDAP rule; however, members who are named static members will not be removed as part of the expansion process.

When an entity accesses the groups that were expanded in step 1354 and/or requests to see the members of the group (step 1356), the entity sees the expanded list of members. Additionally, any process that needs to access members of a group will access the membership generated in the expansion process. In one embodiment, the process of FIG. 23 can be automatically repeated (step 1358) using a background process or any other means.

In one embodiment, the process of expanding groups can only be performed on groups that have an expansion attribute that is set to true. Additionally, the person or entity expanding the group must have read access for the group expansion attribute and the dynamic filter attribute. That user must also have write access for the static member attribute. In one embodiment, all the expanded members are stored in the static member attribute with the original static members. In another embodiment, all of the original static members can be stored in one attribute and the members added during expansion stored in another attribute.

Another feature of Group Manager 44 is the ability to dynamically modify groups during run time. This feature is based on attaching auxiliary object classes to structural object classes. A structural object class can be instantiated to create a group such that for each entry in the directory there is only one structural object class. The structural object class cannot change after the object has been instantiated and is being used. One or more auxiliary object classes can be attached to any structural object class in a directory. The structural object class defines a set of attributes. The auxiliary object class also has a set of attributes. When an auxiliary object class is attached to an object class, the attributes of the auxiliary class are added to the object. Once instantiated, a structural object class cannot be modified or removed; auxiliary object classes, however, can be added or removed. Group manager 44 provides the user with the ability to add or remove auxiliary object classes on the fly using a GUI.

Prior identity systems allow for the addition of auxiliary classes to structural classes upon creation of the object. The present invention allows for auxiliary classes to be added and removed subsequent to object creation. That is, dynamically, an existing object class can have additional attributes added to the group object or removed from the group object by adding or removing auxiliary classes.

When creating a group, an administrator (or other user with sufficient privileges) is provided with a graphical user interface that lists all possible attributes that can be included in the group profile. Some of these attributes are part of structural object class, while others are part of auxiliary object classes (or auxiliary object class schema). If the user selects attributes from an auxiliary class, then those auxiliary classes are added to the object upon creation of the object. After the group is created, various attributes can be populated with data values. Subsequent to this time, attributes that are associated with auxiliary classes can be removed or added to the group. In addition to adding flexibility to defining which attributes are associated with a group, the present invention allows for bulk deletion of attributes. Simply removing the auxiliary object class from the group entry will automatically delete all attributes of the removed auxiliary object class.

Figure 24:
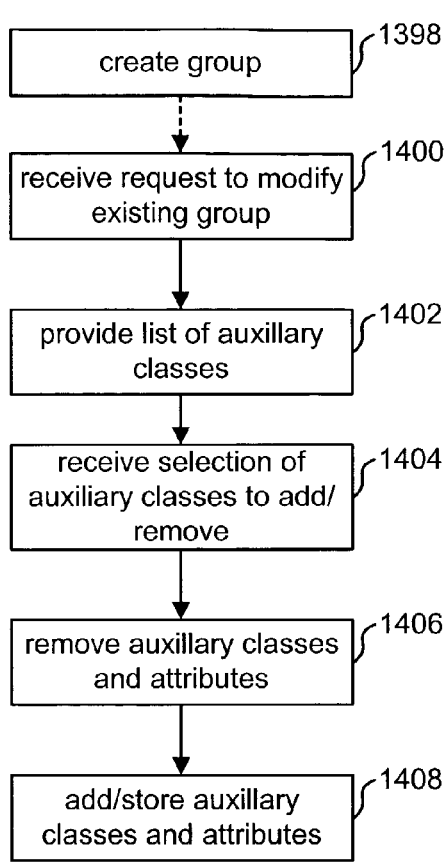
FIG. 24 is a flow chart describing an overview of an exemplar process for adding and removing auxiliary classes.

FIG. 24 is a flowchart describing an overview of the process for adding and removing attributes to a group during run time. In step 1398, a group is created. This step includes determining which attributes to include in the group definition. Based on the attributes chosen, a structural class and the appropriate auxiliary classes are added to the group. In one implementation, the group is created by instantiating the appropriate classes to create a group object representing the group identity profile. In one embodiment, a group can be created that has an auxiliary class, but no attributes of that auxiliary class. The system can use a workflow to create the group and the workflow knows which auxiliary classes to use. The arrow from step 1398 to step 1400 is depicted as a doted line to indicate that time and other steps pass before step 1400 is performed. That is, step 1400 is performed after a group has been created and, possibly, after the various attributes have been populated with data. In step 1400, Group Manager 44 receives a request to modify the existing group. This can happen from Configure tab 440. Alternatively, while viewing a group, Group Manager 44 will display a "modify group" button. Selecting that button allows the user to request a modification to the group being viewed, if the user has sufficient privileges. In step 1402, Group Manager 44 provides a list of auxiliary classes that can be added or removed from the existing group. In an alternative embodiment, Group Manager 44 provides a list of attributes to add or remove, with each of the attributes being associated with auxiliary classes. The auxiliary classes and/or attributes to be added or removed are reported to the user via a graphical user interface. Next to each class (or each attribute) is a check box. The user can check the check box to indicate that the class (or attribute) should be added. The user can uncheck check box to indicate that the class (or attribute) should be removed. In step 1404, the selection of classes (or attributes) to be added and removed are received by Group Manager 44 from the graphical user interface and stored. In step 1406, those auxiliary classes selected to be removed are then removed from the group object including removing those attributes from the group object. In step 1408, the auxiliary class selected to be added and their associated attributes are added to the group object. After step 1408, the group can be used as any other group; for example, a user can be authorized to access a resource based on attributes of or membership in a group.

Figure 25:
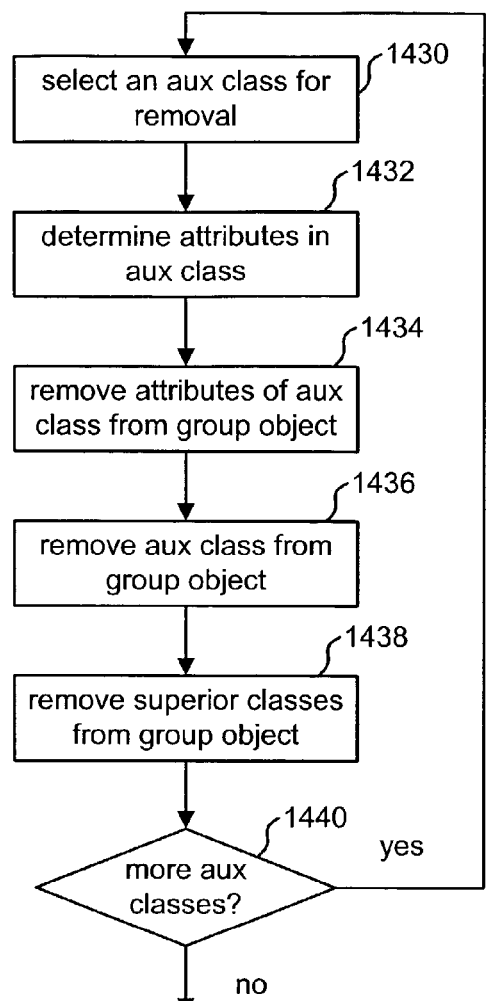
FIG. 25 is a flow chart describing one embodiment of a process for removing auxiliary classes.

FIG. 25 is a flowchart describing the process for removing auxiliary classes and their associated attributes from an object. In step 1430, Group Manager 44 selects one of the classes that have been marked for removal. In step 1432, Group Manager 44 determines which attributes are associated with that selected auxiliary class. The attributes identified in step 1432 do not include attributes that are part of a class that is not being removed. In step 1434, those attributes that are determined in step 1432 are removed from the group object. When the attributes are removed, all data stored in those attributes is deleted. In step 1436, the actual auxiliary class is removed from the group object. In step 1438, all auxiliary classes that are superior classes to the currently selected auxiliary class (see step 1430) are removed from the group object. In many instances, the auxiliary classes are part of an object oriented hierarchy where auxiliary classes can be subclasses of other classes (called superior classes). A subclass inherits from the superior class. In many cases, a particular auxiliary class may have a superior class, which has a superior class, which has a superior class, and so on. Thus, the chain of superior classes from the auxiliary class will go all the way up the tree to the root class. Therefore, some auxiliary classes will have many superior classes. All of the superior classes for a particular auxiliary class are removed when that auxiliary class is removed. Step 1436, however, does not remove a superior class, if that superior class is also superior to another auxiliary class that is part of the object and is not being removed. There is no need to remove the attributes of the superior classes because all those attributes have been inherited by the auxiliary class and already removed in step 1434. In step 1440, it is determined whether there are any more auxiliary classes to be removed. If there are more auxiliary classes to be removed, then the method loops to step 1430. If there are no more auxiliary classes to remove, then the process is complete. Note that some directories do not allow for the modification of the object class attribute; therefore, in those cases, only the attributes are removed.

Figure 26:
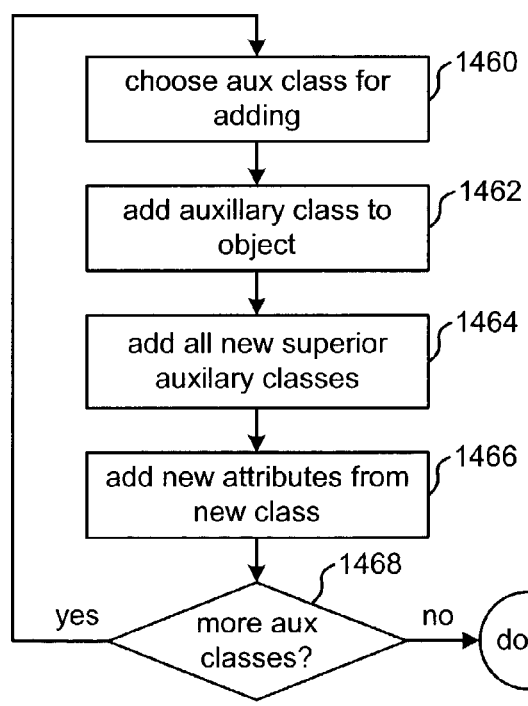
FIG. 26 is a flow chart describing one embodiment of a process for adding auxiliary classes.

FIG. 26 is a flowchart describing a process for adding to the group object those auxiliary classes that have been marked for addition. In step 1460, Group Manager 44 chooses an auxiliary class for adding to the group object from those auxiliary classes marked for addition. In step 1462, the chosen auxiliary class is added to the group object. In step 1464, all superior classes of the auxiliary class chosen in step 1460 that are not already part of the group object are added to the group object. In step 1466, all of the attributes from the auxiliary class selected in step 1460 are added to the group object. In step 1468, it is determined whether there are any more auxiliary classes to add. If there are more auxiliary classes to add, then the method loops back to step 1460. If there are no more auxiliary classes to add, then the method of FIG. 26 is completed.

The ability to add or remove from an existing group at runtime provides greater flexibility in defining the content for groups. Furthermore, the removal of an auxiliary class provides a means to bulk delete a set of attributes because removing an auxiliary class will, in one embodiment, delete all attributes for the removed class. Finally, the ability to add or remove from an existing group provides for less coupling between a group schema and group entries. For example, if the schema changes such that a group auxiliary class is removed, only those group entries that have that auxiliary class need to be updated.

The Identity System also includes an "Advanced Group" auxiliary object class that contains the attributes necessary to implement some of the unique functionalities described above. Administrators can attach the "Advanced Group" to a group in order to provide values for attributes that control features such as Subscription/Unsubscription and Dynamic Membership. In one embodiment, the "Advanced Group" consists of one auxiliary class that includes the attributes listed below. In another embodiment, the "Advanced Group" consists of a plurality of classes.

The attributes in the "Advanced Group" related to Subscription/Unsubscription are:
obgroupsubscriptiontype—stores the subscription policy
obgroupsubscriptionfilter—stores an LDAP rule used with the Open with Filter policy
obgroupsubscribenotification—stores values of either "subscribe" or "unsubscribe" indicating whether or not the user should receive an email upon subscribing or unsubscribing from the group.
obgroupsubscribemessage—stores a customized message the user receives upon subscribing to the group
obgroupunsubscribemessage—stores a customized message the user receives upon unsubscribing from the group The attributes related to Dynamic Membership are:
obgroupdynamicfilter—stores the LDAP rule that defines the group's dynamic membership
obgrouppuredynamic—stores either "true" or "false" indicating whether or not static members can be added to the group The following two attributes belong to neither of the two categories above but are included here for completion:
obgroupsimplifiedaccesscontrol—stores the initial attribute access control policy applied to newly created group
obgroupadministrator—stores the user selected as the group administrator.

The discussions above regarding workflows, groups, communication between Identity Servers, etc., primarily pertain to managing and using the Identity System. As stated above, the Identity System manages identity profiles. These identity profiles are used, among other things, to authenticate users and to authorize users to access resources. The Access System has primary responsibility for providing authentication and authorization services. In one embodiment, authentication and authorization services are performed based on using identity profiles with authentication and authorization rules. These authentication and authorization rules are associated with policy domains and policies, as described above.

The present invention supports the use of multiple authentication schemes. An authentication scheme comprises an authentication level, a challenge method, an SSL assertion parameter, a challenge redirect parameter, and authentication plug-ins. The authentication level represents an arbitrary designation of the level of confidence that an administrator has in a particular authentication scheme relative to other authentication schemes.

In one embodiment of the present invention, an authentication scheme can specify one of four challenge methods: none, basic, form, and X.509. If an authentication scheme's challenge method is set to "none," no authentication is required to access a requested resource, thus allowing support for unauthenticated users. This challenge method can be used over both unsecured as well as SSL connections. The "basic" challenge method can also be used over both unsecured and SSL connections. The "X.509" challenge method can be used over an SSL connection between a user's browser and Web Server host. A "form" challenge method employs a custom, site-specific HTML form presented to the user, who enters information and submits the form. Subsequent processing is determined by the administrator at the time the authentication scheme is created. Form challenge methods can be used over both unsecured and SSL connections.

The SSL parameter of an authentication scheme identifies whether SSL is to be asserted on the connection to the user's browser by the Web Server. The challenge parameter identifies where to redirect a request for authentication for the particular authentication scheme. Authentication plug-ins are necessary for processing the user's supplied information. Authentication plug-ins can interface with Access Server 34 through an authentication API.

An authentication scheme that an attacker can easily and profitability eavesdrop upon is typically considered "weak." In one embodiment, the basic authentication challenge method places the user's credential (supplied information), a simple password, "in the clear" over an unsecured network connection. However, the authentication scheme can be made stronger by passing the user's credential over an encrypted connection, such as SSL. In one embodiment, given two authentication schemes (one with and one without SSL), an access administrator will assign the authentication scheme without SSL to a lower authentication level than the authentication using SSL.

When a user first requests a protected resource, the user is challenged according to either: (1) the authentication scheme defined by the first level authentication rule in the applicable policy domain, or (2) the second level authentication rule in the applicable policy associated with the requested resource. If the user satisfies the authentication rule, an encrypted authentication cookie is passed to the user's browser indicating a successful authentication. Once authenticated, the user may request a second resource protected by a different policy domain and/or policy with a different authentication rule. The user is allowed access to the second resource without re-authenticating under the following condition: the authentication level of the authentication scheme used to successfully authenticate for the first resource is equal to or greater than the authentication level of the authentication scheme of the second resource. Otherwise, the user is challenged and asked to re-authenticate for the second resource in accordance with the second resource's higher level authentication scheme. Satisfaction of a higher or lower authentication level is determined by evaluating the authentication cookie sent by the user's browser when requesting the second resource. In one embodiment of the present invention, administrators can define an unlimited number of authentication levels.

Once authenticated, a user can explicitly log out, causing authentication cookies cached (or otherwise stored) by the user's browser to be destroyed or become invalid. Authentication cookies can also be set by an administrator to be destroyed after a maximum idle time has elapsed between requests to resources protected in accordance with the present invention.

Figure 27:
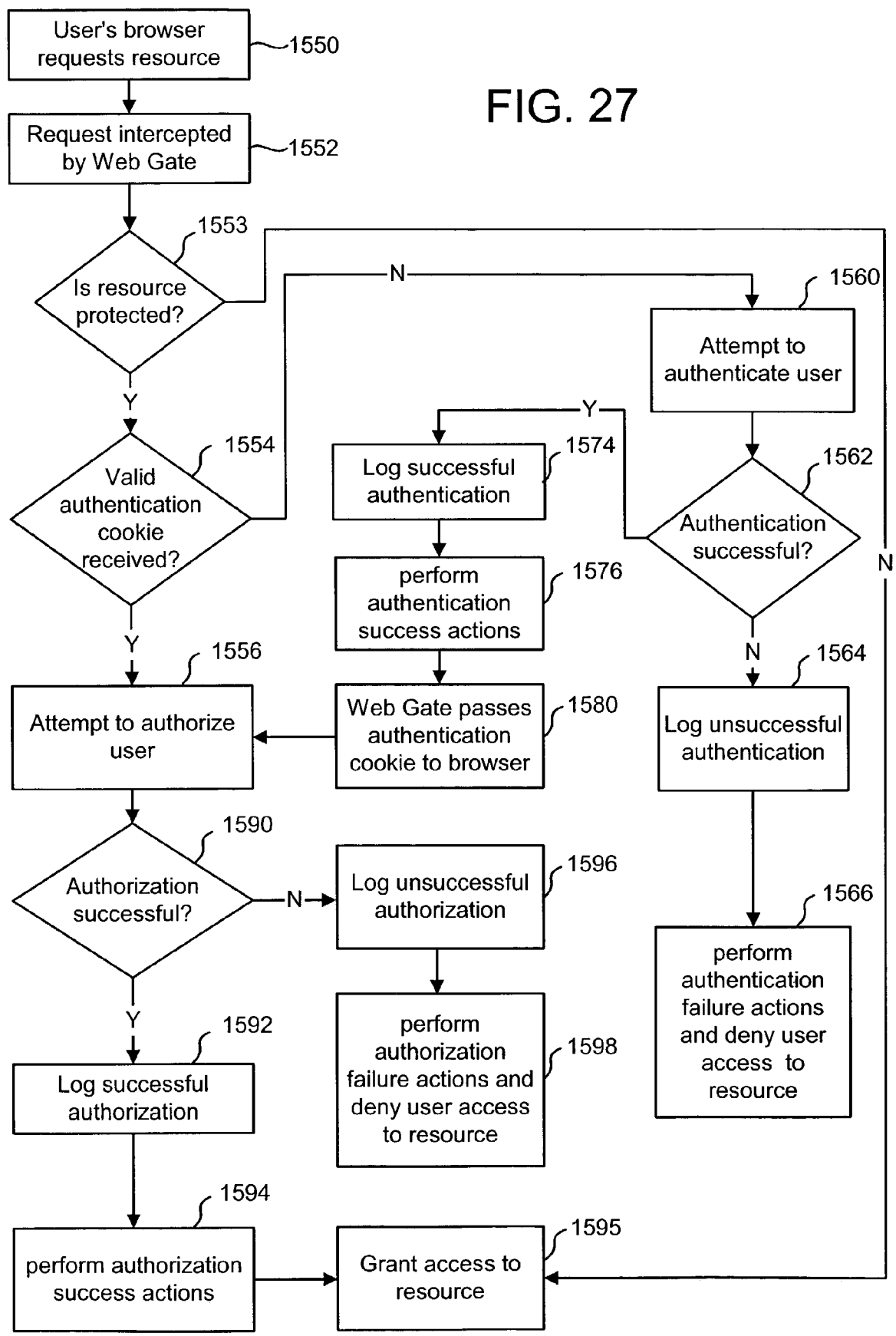
FIG. 27 is a flow chart describing an exemplar process performed by the Access System of one embodiment of the present invention.

FIG. 27 provides a flow chart for one embodiment of a method for authenticating, authorizing, and logging. In step 1550, a user's browser 12 requests a web-enabled resource 22 or 24. The request is intercepted by Web Gate 28 in step 1552. The method then determines whether the requested resource is protected by an authentication and/or authorization rule in step 1553. If the resource is not protected, then access is granted to the requested resource in step 1595. If the requested resource is protected, however, the method proceeds to step 1554. If the user has previously authenticated for a protected resource in the same domain, a valid authentication cookie is passed by browser 12 with the request in step 1550. The authentication cookie is intercepted by Web Gate in step 1552. If a valid cookie is received (step 1554), the method attempts to authorize the user in step 1556. If no valid authentication cookie is received (step 1554), the method attempts to authenticate the user for the requested resource (step 1560).

If the user successfully authenticates for the requested resource (step 1562), then the method proceeds to step 1574. Otherwise, the unsuccessful authentication is logged in step 1564. After step 1564, the system then performs authentication failure actions and Web Gate 28 denies the user access to the requested resource in step 1566. In step 1574, the successful authentication of the user for the resource is logged. The method then performs authentication success actions in step 1576. In response to the successful authentication, Web Gate 28 then passes a valid authentication cookie to browser 12 (step 1580), which stores the cookie. After passing the cookie in step 1580, the system attempts to authorize in step 1556.

In step 1556, the method determines whether the user is authorized to access the requested resource. If the user is authorized (step 1590), the method proceeds to step 1592. Otherwise, the unsuccessful authorization is logged in step 1596. After step 1596, the method performs authorization failure actions (step 1598) and Web Gate 28 denies the user access to the requested resource. If authorization is successful (step 1590), then the successful authorization of the user is logged in step 1592. Authorization success actions are performed in step 1594. The user is granted access to the requested resource in step 1595. In one embodiment of step 1595, some or all of HTTP request information is provided to the resource. In one or more scenarios, the resource being accessed is the Identity System.

Figure 28:
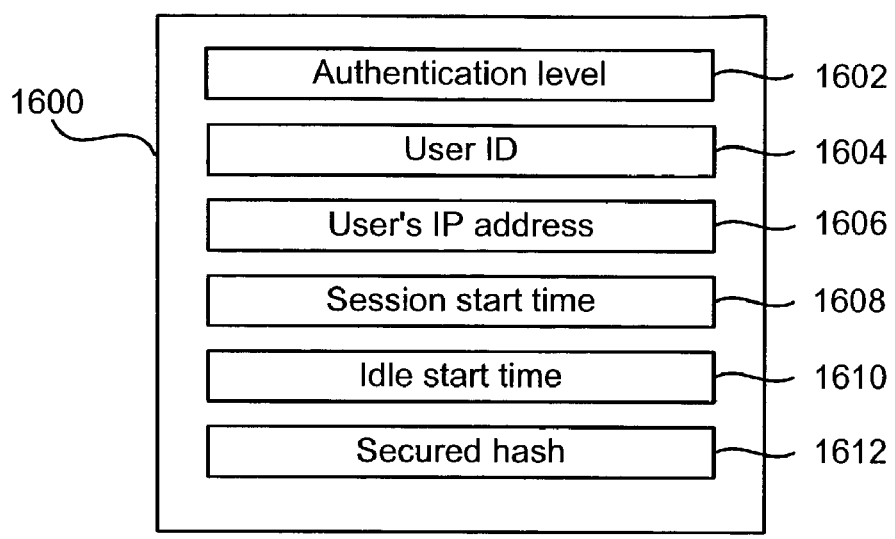
FIG. 28 is a block diagram depicting the components of one embodiment of a cookie.

FIG. 28 provides a block diagram of an authentication cookie 1600 passed by Web Gate 28 to browser 12 in step 1580 of FIG. 27. Cookie 1600 is encrypted with a symmetric cipher so that cookies from all instances of Web Gate 28 in a given deployment of the present invention may be encrypted using the same key. This key (called a shared secret) is stored on Directory Server 36 and distributed to each of the Web Gates 28 by Access Server 34. The shared secret can change as often as desired by an administrator. In one embodiment of the present invention, cookie 1600 is encrypted using RC4 encryption with a 2048 bit key. In one embodiment, previously valid keys are grandfathered such that both the current key and the immediately prior key will both work to de-crypt encrypted cookie 1600. The present invention features a one-button key re-generation function. This function is easily scriptable.

In one embodiment, the information stored by cookie 1600 includes: (1) the authentication level 1602 of the authentication scheme used to create the cookie, (2) the user ID 1604 of the authenticated user, (3) the IP address 1606 of the authenticated user, and (4) session start time 1608 identifying the time at which cookie 3150 was created. If the time elapsed since the session start time 1608 exceeds a maximum session time, the cookie will become invalid. Idle start time 1610 is also stored, which identifies the time when the previous HTTP request for a protected resource was made in which cookie 1600 was passed. If the time elapsed since the idle start time 1610 exceeds a maximum idle time, the cookie will become invalid.

Both of these time limits force users to re-authenticate if they have left a session unattended for longer than the maximum session or idle times. In one embodiment, user ID 1604 stores the distinguished name for the authenticated user.

Cookie 1600 also stores a secured hash 1612 of information 1602, 1604, 1606, 1608, and 1610. In one embodiment of the present invention, secured hash 1612 is created using an MD5 hashing algorithm. Most Internet browsers cache a user's supplied authentication information during basic and certificate authentication challenge methods, and then transparently re-send the information upon receiving an authentication challenge from a Web Server. In one embodiment, an administrator can enable a form authentication challenge method requiring end users to re-authenticate upon expiration of the maximum session or maximum idle time limits.

More details of various processes for authenticating and authorizing, including using an application program interface, can be found in U.S. patent application Ser. No. 09/814,091, "Access System Interface," filed on Mar. 21, 2001, Charles W. Knouse and Minoo Gupta ("'091 application"), which in its entirety is incorporated herein by reference. Specifically, FIGS. 14–56 of the '091 application describe the details of one set of implementations for authenticating and authorizing. FIGS. 58–62 of the '091 application describe a set of embodiments that use an application program interface for accessing the system. The present invention can make use of the authentication and/or authorization technology described in the '091 patent or various other methods of authentication and/or authorization.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A computer implemented method for provisioning tasks, said method comprising the steps of:
   (a) determining whether a job code attribute for an entity is supported by a plurality of provisioning systems, wherein said job code attribute corresponds to a set of external resources for said entity; and
   (b) provisioning a set of tasks related to said set of external resources to said plurality of provisioning systems in response to said job code attribute, wherein provisioning the set of tasks comprises
   (1) submitting a first request for a first task from said set of tasks to a first provisioning system in said plurality of provisioning systems, wherein said first request calls for said first provisioning system to affect a first resource in said set of external resources,
   (2) submitting a second request for a second task from said set of tasks to a second provisioning system in said plurality of provisioning systems, wherein said second request calls for said second provisioning system to affect a second resource in said set of external resources,
   (3) determining whether any tasks in said set of tasks failed,
   (4) in response to determining none of tasks in said set of tasks have failed, signaling that said set of tasks have been provisioned,
   (5) in response to determining one or more tasks in said set of tasks have failed, determining whether to complete provisioning for said set of tasks, if one or more tasks in said set of tasks are determined to have failed,
   (6) in response to determining to complete provisioning for said set of tasks, continuing provisioning tasks of set that have not been determined to have failed, and
   (7) in response to determining not to complete provisioning for said set of tasks, signaling a provisioning error.

2. The computer implemented method of claim 1, wherein said set of external resources includes multiple resources.

3. The computer implemented method of claim 1, wherein said step (a) includes the step of:
   (1) determining whether each resource in said set of external resources is supported by at least one provisioning system in said plurality of provisioning systems.

4. The computer implemented method of claim 1, wherein said step (a) includes the step of:
   (1) comparing said job code attribute to an entry in a set of control information.

5. The computer implemented method of claim 4, wherein said entry in said set of control information includes a first field identifying a job code and second field identifying a resource.

6. The computer implemented method of claim 4 further including the step of:
   (c) maintaining said set of control information.

7. The computer implemented method of claim 6, wherein said step (c) includes the steps of:
   (1) retrieving information from said plurality of provisioning systems; and
   (2) storing said information from said plurality of provisioning systems in said set of control information.

8. The computer implemented method of claim 7, wherein said steps (c)(1) and (c)(2) are repeated after a predetermined period of time.

9. The computer implemented method of claim 7, wherein said information from said plurality of provisioning systems identifies external resources supported by said plurality of provisioning systems.

10. The computer implemented method of claim 1, further including the step of:
    (d) obtaining approval for provisioning said set of tasks.

11. The computer implemented method of claim 10, wherein said step (d) includes the steps of:
    (1) requesting approval for provisioning said set of tasks; and
    (2) determining whether any requests in said step (d)(1) have been rejected.

12. The computer implemented method of claim 11, wherein said step (d) further includes the step of:
    (3) determining whether to proceed with provisioning if any requests in said step (d)(1) have been rejected.

13. One or more processor readable storage devices having processor readable code embodied on said processor readable storage devices, said processor readable code for programming one or more processors to perform a method for provisioning tasks, said method comprising the steps of:
    (a) determining whether a job code attribute for an entity is supported by a plurality of provisioning systems, wherein said job code attribute corresponds to a set of external resources for said entity; and (b) provisioning a set of tasks related to said set of external resources to said plurality of provisioning systems in response to said job code attribute, wherein provisioning the set of tasks comprises
  (1) submitting a first request for a first task from said set of tasks to a first provisioning system in said plurality of provisioning systems, wherein said first request calls for said first provisioning system to affect a first resource in said set of external resources,
  (2) submitting a second request for a second task from said set of tasks to a second provisioning system in said plurality of provisioning systems, wherein said second request calls for said second provisioning system to affect a second resource in said set of external resources,
  (3) determining whether any tasks in said set of tasks failed,
  (4) in response to determining none of tasks in said set of tasks have failed, signaling that said set of tasks have been provisioned,
  (5) in response to determining one or more tasks in said set of tasks have failed, determining whether to complete provisioning for said set of tasks, if one or more tasks in said set of tasks are determined to have failed,
  (6) in response to determining to complete provisioning for said set of tasks, continuing provisioning tasks of set that have not been determined to have failed, and
  (7) in response to determining not to complete provisioning for said set of tasks, signaling a provisioning error.

14. One or more processor readable storage devices according to claim 13, wherein said set of external resources includes multiple resources.

15. One or more processor readable storage devices according to claim 13, wherein said step (a) includes the step of:
  (1) determining whether each resource in said set of external resources is supported by at least one provisioning system in said plurality of provisioning systems.

16. One or more processor readable storage devices according to claim 15, wherein said method further includes the step of:
  (c) maintaining said set of control information.

17. One or more processor readable storage devices according to claim 16, wherein said step (c) includes the steps of:
  (1) retrieving information from said plurality of provisioning systems; and
  (2) storing said information from said plurality of provisioning systems in said set of control information.

18. One or more processor readable storage devices according to claim 17, wherein said information from said plurality of provisioning systems identifies external resources supported by said plurality of provisioning systems.

19. One or more processor readable storage devices according to claim 13, wherein said step (a) includes the step of:
  (1) comparing said job code attribute to an entry in a set of control information.

20. One or more processor readable storage devices according to claim 19, wherein said entry in said set of control information includes a first field identifying a job code and second field identifying a resource.

21. One or more processor readable storage devices according to claim 13, wherein said method further includes the step of:

(d) obtaining approval for provisioning said set of tasks.

22. One or more processor readable storage devices according to claim 21, wherein said step (d) includes the steps of:
  (1) requesting approval for provisioning said set of tasks; and
  (2) determining whether any requests in said step (d)(1) have been rejected.

23. One or more processor readable storage devices according to claim 22, wherein said step (d) further includes the step of:
  (3) determining whether to proceed with provisioning if any requests in said step (d)(1) have been rejected.

24. An apparatus comprising:
  one or more communications interfaces;
  one or more storage devices; and
  one or more processors in communication with said one or more storage devices and said one or more communication interfaces, said one or more processors perform a method for provisioning tasks, said method comprising the steps of:
  (a) determining whether a job code attribute for an entity is supported by a plurality of provisioning systems, wherein said job code attribute corresponds to a set of external resources for said entity; and
  (b) provisioning a set of tasks related to said set of external resources to said plurality of provisioning systems in response to said job code attribute, wherein provisioning the set of tasks comprises
  (1) submitting a first request for a first task from said set of tasks to a first provisioning system in said plurality of provisioning systems, wherein said first request calls for said first provisioning system to affect a first resource in said set of external resources,
  (2) submitting a second request for a second task from said set of tasks to a second provisioning system in said plurality of provisioning systems, wherein said second request calls for said second provisioning system to affect a second resource in said set of external resources,
  (3) determining whether any tasks in said set of tasks failed,
  (4) in response to determining none of tasks in said set of tasks have failed, signaling that said set of tasks have been provisioned,
  (5) in response to determining one or more tasks in said set of tasks have failed, determining whether to complete provisioning for said set of tasks, if one or more tasks in said set of tasks are determined to have failed,
  (6) in response to determining to complete provisioning for said set of tasks, continuing provisioning tasks of set that have not been determined to have failed, and
  (7) in response to determining not to complete provisioning for said set of tasks, signaling a provisioning error.

25. The apparatus of claim 24, wherein said set of external resources includes multiple resources.

26. The apparatus of claim 24; wherein said step (a) includes the step of:
  (1) determining whether each resource in said set of external resources is supported by at least one provisioning system in said plurality of provisioning systems.

27. The apparatus of claim 24, wherein said step (a) includes the step of:
  (1) comparing said job code attribute to an entry in a set of control information, wherein said entry in said set of control information includes a first field identifying a job code and second field identifying a resource.

28. The apparatus of claim 27, wherein said method further includes the step of:
   (c) maintaining said set of control information.

29. The apparatus of claim 28, wherein said step (c) includes the steps of:
   (1) retrieving information from said plurality of provisioning systems, wherein said information from said plurality of provisioning system identifies external resources supported by said plurality of provisioning systems; and
   (2) storing said information from said plurality of provisioning systems in said set of control information.

30. The apparatus of claim 24, wherein said method further includes the step of:
   (d) obtaining approval for provisioning said set of tasks.

31. The apparatus of claim 24, wherein said apparatus includes a Provisioning Bridge Server.

32. The apparatus of claim 31, wherein said Provisioning Bridge Server performs said steps (a) and (b).

33. The apparatus of claim 31, wherein said apparatus includes an Identity Server in communication with said Provisioning Bridge Server and a set of control information in communication with said Provisioning Bridge Server.

34. The apparatus of claim 31, wherein said apparatus includes an Identity System.

* * * * *